United States Patent
Yuzuriha

(10) Patent No.: US 10,999,444 B2
(45) Date of Patent: May 4, 2021

(54) ACOUSTIC ECHO CANCELLATION DEVICE, ACOUSTIC ECHO CANCELLATION METHOD AND NON-TRANSITORY COMPUTER READABLE RECORDING MEDIUM RECORDING ACOUSTIC ECHO CANCELLATION PROGRAM

(71) Applicant: PANASONIC INTELLECTUAL PROPERTY CORPORATION OF AMERICA, Torrance, CA (US)

(72) Inventor: Shinichi Yuzuriha, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/711,736

(22) Filed: Dec. 12, 2019

(65) Prior Publication Data

US 2020/0195783 A1    Jun. 18, 2020

Related U.S. Application Data

(60) Provisional application No. 62/778,684, filed on Dec. 12, 2018.

(30) Foreign Application Priority Data

Apr. 8, 2019    (JP) .............................. JP2019-073738
Sep. 9, 2019    (JP) .............................. JP2019-163681

(51) Int. Cl.
*G10L 21/0224*    (2013.01)
*H04M 9/08*    (2006.01)
(Continued)

(52) U.S. Cl.
CPC ......... *H04M 9/082* (2013.01); *G10L 21/0224* (2013.01); *G10L 21/0232* (2013.01);
(Continued)

(58) Field of Classification Search
CPC ....... G01S 5/22; G10L 21/02; G10L 21/0208; G10L 21/0224; G10L 21/0232;
(Continued)

(56) References Cited

U.S. PATENT DOCUMENTS 5,323,459 A     6/1994  HIrano
5,463,618 A *  10/1995  Furukawa .............. H04B 3/234
                                                           370/290
(Continued)

FOREIGN PATENT DOCUMENTS

EP    0627825 A2    12/1994
JP    5826712 B2    12/2015
(Continued)

OTHER PUBLICATIONS

Extended European Search Report, dated Apr. 8, 2020, from the European Patent Office (EPO) for the corresponding European Patent Application No. 19213522.6.

*Primary Examiner* — Gerald Gauthier
(74) *Attorney, Agent, or Firm* — Greenblum & Bernstein, P.L.C.

(57) ABSTRACT

An acoustic echo cancellation device includes: a first echo canceller which, using an input signal obtained from at least two microphones and a reproduced signal outputted to a speaker, produces a first pseudo echo signal which indicates a component of the reproduced signal contained in the input signal; and a second echo canceller which, using at least one input signal outputted from the at least two microphones and the first pseudo echo signal, produces a second pseudo echo signal which indicates a component of the first pseudo echo (Continued)

signal contained in the at least one input signal, and cancels an acoustic echo component of the at least one input signal using the second pseudo echo signal.

6 Claims, 10 Drawing Sheets

(51) Int. Cl.
    *G10L 21/0232*         (2013.01)
    *H04R 3/00*             (2006.01)
    *H04R 3/02*             (2006.01)
    *G10L 21/0208*         (2013.01)
    *G10L 21/0216*         (2013.01)

(52) U.S. Cl.
    CPC ............... *H04R 3/005* (2013.01); *H04R 3/02* (2013.01); *G10L 2021/02082* (2013.01); *G10L 2021/02165* (2013.01)

(58) Field of Classification Search
    CPC ........... G10L 2021/02082; G10L 2021/02165; H04M 9/082; H04M 3/002; H04R 3/005; H04R 3/02; H04R 3/00; H04R 29/00; H04W 4/60
    USPC ............... 370/291, 290; 379/388.03, 406.01, 379/406.05, 406.06, 406.08, 406.11, 379/406.12; 381/66, 26, 93; 455/569.2, 455/570; 704/233, 226
    See application file for complete search history.

(56) References Cited

U.S. PATENT DOCUMENTS

| | | | | |
|---|---|---|---|---|
| 5,513,265 | A | | 4/1996 | Hirano |
| 5,604,799 | A | * | 2/1997 | Komoda ............... H04M 9/082 379/406.06 |
| 5,631,899 | A | * | 5/1997 | Duttweiler ............ H04M 9/082 370/291 |
| 5,636,323 | A | * | 6/1997 | Umemoto ............. H04M 9/082 704/226 |
| 5,663,955 | A | * | 9/1997 | Iyengar ................. H04M 9/082 370/291 |
| 5,696,819 | A | * | 12/1997 | Suizu .................... H04M 9/082 370/286 |
| 5,737,408 | A | * | 4/1998 | Hasegawa ............. H04M 9/082 379/406.05 |
| 6,001,131 | A | * | 12/1999 | Raman ................. G10L 21/0208 704/226 |
| 6,097,971 | A | * | 8/2000 | Hosoi ................... H04M 9/082 379/406.12 |
| 6,404,886 | B1 | * | 6/2002 | Yoshida ................ H04M 9/082 379/406.01 |
| 6,449,361 | B1 | * | 9/2002 | Okuda .................. H04M 9/082 379/406.01 |
| 6,505,057 | B1 | * | 1/2003 | Finn .................... G10L 21/0208 455/557 |
| 6,738,482 | B1 | | 5/2004 | Jaber |
| 6,950,513 | B2 | * | 9/2005 | Hirai ...................... H04M 9/082 379/406.01 |
| 7,440,891 | B1 | * | 10/2008 | Shozakai ................ G10L 15/20 704/233 |
| 7,698,133 | B2 | * | 4/2010 | Ichikawa ............ G10L 21/0208 704/226 |
| 7,907,977 | B2 | * | 3/2011 | Fratila .................... H04M 9/082 455/570 |
| 8,010,354 | B2 | * | 8/2011 | Otsuka ............... G01C 21/3608 704/233 |
| 8,954,324 | B2 | * | 2/2015 | Wang ...................... G10L 25/78 704/233 |
| 9,858,944 | B1 | * | 1/2018 | Malik ................. G10L 21/0208 |
| 9,973,633 | B2 | * | 5/2018 | Schroeter ................ H04R 3/04 |
| 10,149,047 | B2 | * | 12/2018 | Geiger .................... G10L 21/02 |
| 10,225,395 | B2 | * | 3/2019 | Singh ..................... H04L 69/16 |
| 10,746,840 | B1 | * | 8/2020 | Barton .................. G01S 3/8083 |
| 2003/0076947 | A1 | * | 4/2003 | Furuta ...................... H04B 3/23 379/406.01 |
| 2004/0228474 | A1 | * | 11/2004 | Taniguchi ............. H04M 9/082 379/406.12 |
| 2004/0252827 | A1 | * | 12/2004 | Sasaki .................... H04M 9/082 379/406.08 |
| 2007/0127708 | A1 | * | 6/2007 | Yamashita ........... H04M 1/6033 379/388.03 |
| 2008/0107281 | A1 | * | 5/2008 | Togami ................. H04M 9/082 381/66 |
| 2008/0219433 | A1 | * | 9/2008 | Liu ...................... H04M 1/6033 379/406.06 |
| 2008/0273716 | A1 | * | 11/2008 | Saito .................... H04M 9/082 381/93 |
| 2009/0089054 | A1 | * | 4/2009 | Wang ..................... H04M 9/082 704/233 |
| 2010/0166195 | A1 | * | 7/2010 | Ukai ...................... H04R 3/005 381/26 |
| 2010/0195815 | A1 | * | 8/2010 | Tada ..................... H04M 9/082 379/406.01 |
| 2011/0206212 | A1 | | 8/2011 | Derkx et al. |
| 2013/0034241 | A1 | | 2/2013 | Pandey et al. |
| 2013/0039504 | A1 | | 2/2013 | Pandey et al. |
| 2013/0216056 | A1 | * | 8/2013 | Thyssen ................ H04M 9/082 381/66 |
| 2016/0127535 | A1 | * | 5/2016 | Theverapperuma .. H04M 9/082 455/570 |
| 2016/0142548 | A1 | | 5/2016 | Pandey et al. |
| 2016/0277588 | A1 | * | 9/2016 | Jang ....................... H04W 4/60 |
| 2016/0300584 | A1 | | 10/2016 | Pandey et al. |
| 2016/0302006 | A1 | | 10/2016 | Pandey et al. |
| 2016/0337523 | A1 | | 11/2016 | Pandey et al. |
| 2017/0134849 | A1 | | 5/2017 | Pandey et al. |
| 2018/0343514 | A1 | * | 11/2018 | Dusan .............. G10K 11/17881 |
| 2018/0358032 | A1 | * | 12/2018 | Tanaka ................ G10L 21/0272 |
| 2020/0195783 | A1 | * | 6/2020 | Yuzuriha ................. G10L 19/00 |

FOREIGN PATENT DOCUMENTS

| | | |
|---|---|---|
| WO | 01/24575 A2 | 4/2001 |
| WO | 2010/043998 A1 | 4/2010 |

* cited by examiner

ACOUSTIC ECHO CANCELLATION DEVICE, ACOUSTIC ECHO CANCELLATION METHOD AND NON-TRANSITORY COMPUTER READABLE RECORDING MEDIUM RECORDING ACOUSTIC ECHO CANCELLATION PROGRAM

FIELD OF THE INVENTION

This disclosure relates to an acoustic echo cancellation device, an acoustic echo cancellation method, and a non-transitory computer readable recording medium recording an acoustic echo cancellation program that cancel an acoustic echo component of an input signal outputted from a microphone.

BACKGROUND ART

Conventionally, there has been known a microphonic two-way conversation system using a microphone and a speaker. In such a microphonic two-way conversation system, a voice which a talker on a sender side utters is inputted to a microphone on the sender side, is transmitted to equipment on the receiver side via a communication line as a sender signal, and is reproduced by a speaker on the receiver side. A voice reproduced by the speaker on the receiver side propagates a space on the receiver side, is inputted to a microphone on the receiver side, and is transmitted to the sender side. In such an operation, from the speaker on the sender side, a voice which a talker himself/herself utters and is transmitted through a lapse of a time during which the voice passes via the communication line and a time during which the voice propagates in a space on a receiver side is reproduced. The voice which propagates from the speaker on the receiver side to the microphone is referred to as an acoustic echo and brings about the deterioration of conversation quality.

Accordingly, in the microphonic two-way conversation system, an echo canceller which suppresses an acoustic echo is used.

Further, recently, to provide a more natural conversation environment, the development of a microphonic two-way conversation system which uses a plurality of microphones is underway (see JP 5826712 B2, for example).

However, in the above-mentioned prior art, it is difficult to reduce an arithmetic amount for removing an acoustic echo while maintaining a conversation performance. Accordingly, there is still a room for improvement.

SUMMARY OF THE INVENTION

This disclosure is provided for overcoming the above-mentioned drawbacks, and it is an object of this disclosure to provide an acoustic echo cancellation device, an acoustic echo cancellation method, and a non-transitory computer readable recording medium recording an acoustic echo cancellation program which can maintain a conversation performance and can reduce an arithmetic amount for removing an acoustic echo.

According to an aspect of this disclosure, there is provided an acoustic echo cancellation device including: a first echo canceller which, using an input signal obtained from at least two microphones and a reproduced signal outputted to a speaker, produces a first pseudo echo signal which indicates a component of the reproduced signal contained in the input signal; and a second echo canceller which, using at least one input signal outputted from the at least two microphones and the first pseudo echo signal produced by the first echo canceller, produces a second pseudo echo signal which indicates a component of the first pseudo echo signal contained in the at least one input signal, and cancels an acoustic echo component of the at least one input signal using the produced second pseudo echo signal.

Figure 1:
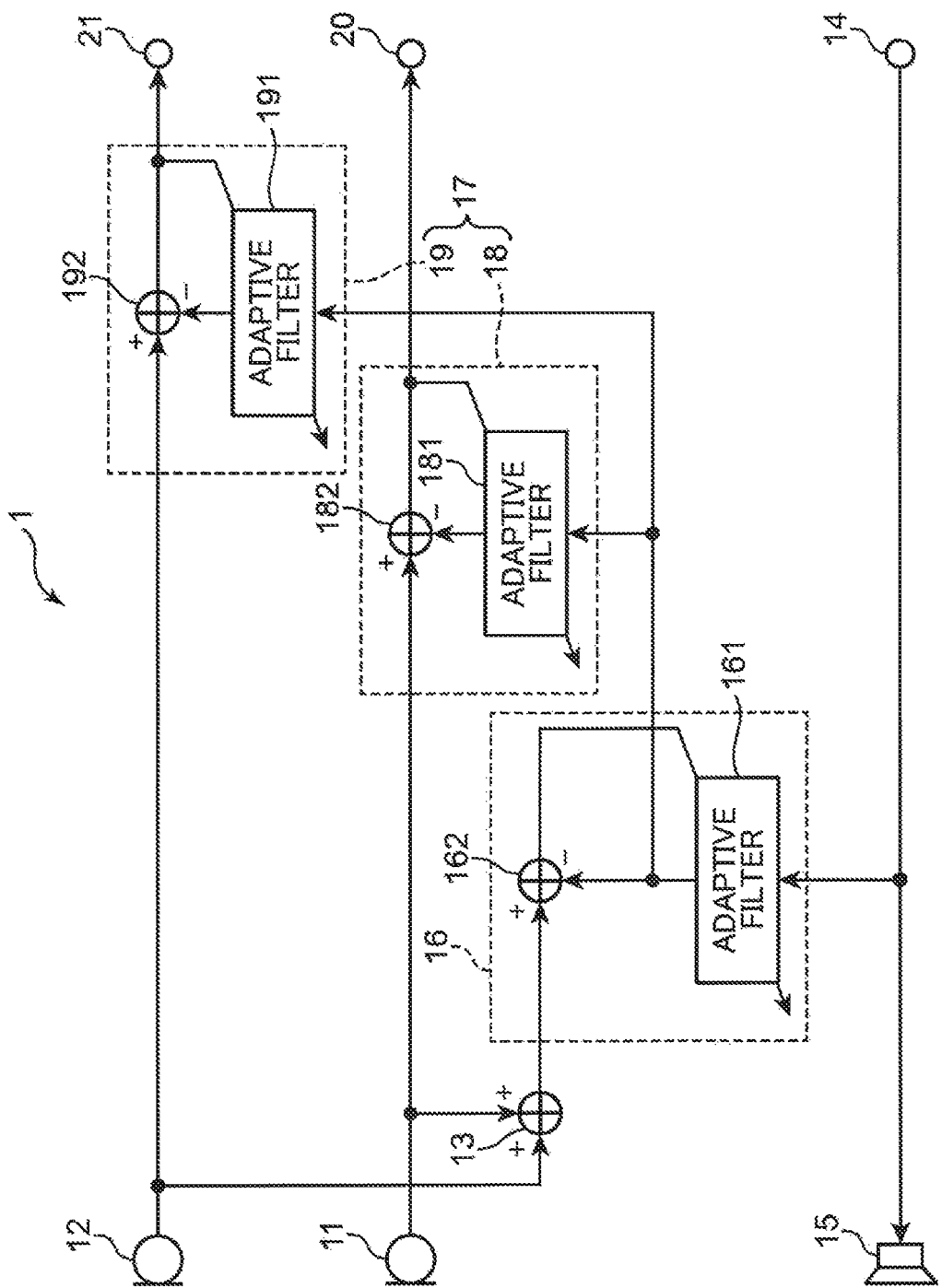
FIG. 1 is a view showing a configuration of a conversation device according to a first embodiment of this disclosure.

DESCRIPTION OF EMBODIMENTS (Finding on which this Disclosure is Based)

In a microphonic conversation system where a plurality of microphones are used, an echo canceller becomes necessary for each microphone. Accordingly, the number of echo cancellers is also increased corresponding to the number of microphones and hence, a total arithmetic amount of the plurality of echo cancellers is increased.

The above-mentioned conventional multi-channel echo cancellation device has the same number of echo replica generating part as the microphones, and each of the echo replica generating parts has the same configuration. Accordingly, as the number of microphones is increased, the number of echo replica generating parts is also increased thus giving rise to a concern that an arithmetic amount for removing an acoustic echo is also increased.

In the above-mentioned conventional multi-channel echo cancellation device, by limiting echo replica producing processing and updating processing of an adaptive filter coefficient within an effective frequency domain, an arithmetic amount is reduced as a whole in a multi-channel microphonic conversation system formed of a large number of speakers and microphones.

However, in the conventional multi-channel echo cancellation device, the frequency domain of the echo replica generating part is limited and hence, a frequency domain which is not learned is generated thus giving rise to a concern that the limitation of the frequency domain becomes a factor of deteriorating a conversation performance.

To overcome the above-mentioned drawbacks, an acoustic echo cancellation device according to an aspect of this disclosure includes: a first echo canceller which, using an input signal obtained from at least two microphones and a reproduced signal outputted to a speaker, produces a first pseudo echo signal which indicates a component of the reproduced signal contained in the input signal; and a second echo canceller which, using at least one input signal outputted from the at least two microphones and the first pseudo echo signal produced by the first echo canceller, produces a second pseudo echo signal which indicates a component of the first pseudo echo signal contained in the at least one input signal, and cancels an acoustic echo component of the at least one input signal using the produced second pseudo echo signal.

With such a configuration, the second pseudo echo signal is produced using the already produced first pseudo echo signal. Accordingly, a filter length (tap length) of an adaptive filter used in producing the second pseudo echo signal can be shortened and hence, a conversation performance can be maintained and, at the same time, an arithmetic amount for removing an acoustic echo can be reduced.

The above-mentioned acoustic echo cancellation device may further include a delay part which delays at least one input signal outputted from the at least two microphones. The second echo canceller may produce a second pseudo echo signal which indicates a component of the first pseudo echo signal contained in the at least one delayed input signal using the at least one delayed input signal and the first pseudo echo signal produced by the first echo canceller, and may cancel an acoustic echo component of the at least one delayed input signal using the produced second pseudo echo signal.

With such a configuration, at least one input signal inputted to the second echo canceller is delayed and hence, a time difference between the first pseudo echo signal produced by the first echo canceller and the at least one input signal is eliminated whereby the second pseudo echo signal can be produced with certainty.

In the above-mentioned acoustic echo cancellation device, the at least two microphones may include a first microphone which outputs a first input signal, and a second microphone which outputs a second input signal, the delay part may include a first delay part which delays the first input signal and a second delay part which delays the second input signal. The acoustic echo cancellation device may further include an adder which adds the first input signal and the second input signal to each other. The first echo canceller may produce the first pseudo echo signal which indicates a component of the reproduced signal contained in an addition signal using the addition signal from the adder and the reproduced signal. The second echo canceller may include: a third echo canceller which produces a third pseudo echo signal which indicates a component of the first pseudo echo signal contained in the delayed first input signal using the delayed first input signal and the first pseudo echo signal produced by the first echo canceller, and cancels an acoustic echo component of the delayed first input signal using the produced third pseudo echo signal; and a fourth echo canceller which produces a fourth pseudo echo signal which indicates a component of the first pseudo echo signal contained in the delayed second input signal using the delayed second input signal and the first pseudo echo signal produced by the first echo canceller, and cancels an acoustic echo component of the delayed second input signal using the produced fourth pseudo echo signal.

With such a configuration, the first input signal inputted to the third echo canceller is delayed and, at the same time, the second input signal inputted to the fourth echo canceller is delayed. Accordingly, a time difference between the first pseudo echo signal produced by the first echo canceller and the first input signal is eliminated, and a time difference between the first pseudo echo signal and the second input signal is eliminated and hence, it is possible to produce the third pseudo echo signal and the fourth pseudo echo signal with certainty.

In the above-mentioned acoustic echo cancellation device, the at least two microphones may include a first microphone which outputs a first input signal, and a second microphone which outputs a second input signal. The acoustic echo cancellation device may further include an adder which adds the first input signal and the second input signal to each other. The first echo canceller may produce the first pseudo echo signal which indicates a component of the reproduced signal contained in an addition signal using the addition signal from the adder and the reproduced signal. The second echo canceller may include: a third echo canceller which produces a third pseudo echo signal which indicates a component of the first pseudo echo signal contained in the first input signal using the first input signal and the first pseudo echo signal produced by the first echo canceller, and cancels an acoustic echo component of the first input signal using the produced third pseudo echo signal; and a fourth echo canceller which produces a fourth pseudo echo signal which indicates a component of the first pseudo echo signal contained in the second input signal using the second input signal and the first pseudo echo signal produced by the first echo canceller, and cancels an acoustic echo component of the second input signal using the produced fourth pseudo echo signal.

In such a configuration, the arrangement positions of at least two microphones differ from each other. Accordingly, a waveform of a reflected wave (echo signal) inputted as an acoustic echo differs between the microphones. In the case where a phase of an echo signal is opposite to a phase of an input signal which is a voice of a talker, when the echo signal is added to the input signal, the input signal is eliminated. Accordingly, it is difficult to cancel an acoustic echo of the input signal. However, a first input signal and a second input signal from at least two microphones are added and hence, an effect of loss of a signal caused by interference of acoustic echoes can be reduced.

In the above-mentioned acoustic echo cancellation device, the at least two microphones may include a first microphone which outputs a first input signal, and a second microphone which outputs a second input signal, the first echo canceller may produce the first pseudo echo signal which indicates a component of the reproduced signal contained in the first input signal using the first input signal and the reproduced signal, and cancel an acoustic echo component of the first input signal using the produced first pseudo echo signal, and the second echo canceller may produce a second pseudo echo signal which indicates a component of the first pseudo echo signal contained in the second input signal using the second input signal and the first pseudo echo signal produced by the first echo canceller, and cancel an acoustic echo component of the second input signal using the produced second pseudo echo signal.

With such a configuration, the second pseudo echo signal is produced using the already produced first pseudo echo signal. Accordingly, a filter length (tap length) of an adaptive filter used in producing the second pseudo echo signal can be shortened and hence, a conversation performance can be maintained and, at the same time, an arithmetic amount for removing an acoustic echo can be reduced.

In the above-mentioned acoustic echo cancellation device, the at least two microphones may include a first microphone which outputs a first input signal, and a second microphone which outputs a second input signal, the first echo canceller may include: a first calculation part that calculates a first error signal which indicates an error between the first input signal and the first pseudo echo signal; a second calculation part that calculates a second error signal which indicates an error between the second input signal and the first pseudo echo signal; an averaging processing part that averages an addition signal obtained by adding the first error signal and the second error signal to each other; and a producing part that produces the first pseudo echo signal which indicates a component of the reproduced signal contained in an average signal using the average signal from the averaging processing part and the reproduced signal, and the second echo canceller may include: a third echo canceller which produces a third pseudo echo signal which indicates a component of the first pseudo echo signal contained in the first input signal using the first input signal and the first pseudo echo signal produced by the first echo canceller, and cancels an acoustic echo component of the first input signal using the produced third pseudo echo signal; and a fourth echo canceller which produces a fourth pseudo echo signal which indicates a component of the first pseudo echo signal contained in the second input signal using the second input signal and the first pseudo echo signal produced by the first echo canceller, and cancels an acoustic echo component of the second input signal using the produced fourth pseudo echo signal.

In such a configuration, the arrangement positions of at least two microphones differ from each other. Accordingly, a waveform of a reflected wave (echo signal) inputted as an acoustic echo differs between the microphones. In the case where a phase of an echo signal is opposite to a phase of an input signal which is a voice of a talker, when the echo signal is added to the input signal, the input signal is eliminated. Accordingly, it is difficult to cancel an acoustic echo of the input signal. However, the error signals of the first input signal and the second input signal from at least two microphones are added to each other and are averaged and hence, an effect of loss of a signal caused by interference of acoustic echoes can be reduced.

Further, the above-mentioned acoustic echo cancellation device may further include: a first converting part that converts the input signal in a time domain into an input signal in a frequency domain; a second converting part that converts the reproduced signal in a time domain into a reproduced signal in a frequency domain; a third converting part that converts the at least one input signal in a time domain into at least one input signal in a frequency domain; and a fourth converting part that converts the first pseudo echo signal in a time domain into a first pseudo echo signal in a frequency domain.

With such a configuration, the first echo canceller and the second echo canceller can produce a first pseudo echo signal and a second pseudo echo signal using an adaptive algorithm in a frequency domain, and a convolution operation can be executed by multiplication and hence, an arithmetic amount can be further reduced.

In the above-mentioned acoustic echo cancellation device, a filter length of the second echo canceller may be shorter than a filter length of the first echo canceller.

With such a configuration, an arithmetic amount for removing an acoustic echo in the second echo canceller can be reduced.

In the above-mentioned acoustic echo cancellation device, the first echo canceller may produce the first pseudo echo signal with respect to the microphone disposed at the position closest to the speaker.

With such a configuration, a first pseudo echo signal which indicates a component of a reproduced signal contained in an input signal is produced using an input signal outputted from the microphone disposed at the position closest to the speaker and the reproduced signal, and a second pseudo echo signal is produced using the produced first pseudo echo signal. Accordingly, a filter length (tap length) of an adaptive filter used in producing the second pseudo echo signal can be shortened.

An acoustic echo cancellation method according to another aspect of this disclosure is an acoustic echo cancellation method in an acoustic echo cancellation device which cancels an acoustic echo component of an input signal outputted from a microphone, the method including: a step of producing a first pseudo echo signal which indicates a component of a reproduced signal contained in the input signal using an input signal obtained from the at least two microphones and the reproduced signal outputted to a speaker; a step of producing a second pseudo echo signal which indicates a component of the first pseudo echo signal contained in the at least one input signal using the at least one input signal outputted from the at least two microphones and the first pseudo echo signal produced by the first echo canceller; and a step of cancelling an acoustic echo component of the at least one input signal using the produced second pseudo echo signal.

With such a configuration, the second pseudo echo signal is produced using the already produced first pseudo echo signal. Accordingly, a filter length (tap length) of an adaptive filter used in producing the second pseudo echo signal can be shortened and hence, a conversation performance can be maintained and, at the same time, an arithmetic amount for removing an acoustic echo can be reduced.

A non-transitory computer readable recording medium recording an acoustic echo cancellation program according to another aspect of this disclosure allows a computer to function as: a first echo canceller which, using an input signal obtained from at least two microphones and a reproduced signal outputted to a speaker, produces a first pseudo echo signal which indicates a component of the reproduced signal contained in the input signal; and a second echo canceller which, using at least one input signal outputted from the at least two microphones and the first pseudo echo signal produced by the first echo canceller, produces a second pseudo echo signal which indicates a component of the first pseudo echo signal contained in the at least one input signal, and cancels an acoustic echo component of the at least one input signal using the produced second pseudo echo signal.

With such a configuration, the second pseudo echo signal is produced using the already produced first pseudo echo signal. Accordingly, a filter length (tap length) of an adaptive filter used in producing the second pseudo echo signal can be shortened and hence, a conversation performance can be maintained and, at the same time, an arithmetic amount for removing an acoustic echo can be reduced.

Hereinafter, embodiments of this disclosure are described with reference to attached drawings. The embodiments described hereinafter form one example which embodies this disclosure and are not intended to limit the technical scope of this disclosure.

First Embodiment

FIG. 1 is a view showing the configuration of a conversation device according to the first embodiment of this disclosure. The conversation device is used as a microphonic hand free conversation system mounted on an automobile or the like, a microphonic two-way communication conference system, an interphone system, and the like.

The conversation device shown in FIG. 1 includes an acoustic echo cancellation device 1, a first microphone 11, a second microphone 12, an input terminal 14, a speaker 15, a first output terminal 20, and a second output terminal 21.

The first microphone 11 and the second microphone 12 are disposed in a space where a talker is present, and collects a voice of the talker. The first microphone 11 outputs a first input signal which indicates the collected voice, to the acoustic echo cancellation device 1. The second microphone 12 outputs a second input signal which indicates the collected voice, to the acoustic echo cancellation device 1.

The input terminal 14 outputs a reproduced signal received from a conversation device on a receiver side (not shown in the drawings) to the acoustic echo cancellation device 1 and the speaker 15.

The speaker 15 outputs the inputted reproduced signal to the outside. When a voice outputted from the speaker 15 is collected by the first microphone 11 and the second microphone 12, the voice uttered by a talker on the receiver side is reproduced from the speaker on the receiver side with a delay. As a result, a so-called acoustic echo is generated. In view of the above, the acoustic echo cancellation device 1 cancels acoustic echo components of the first input signal and the second input signal outputted from the first microphone 11 and the second microphone 12.

The first output terminal 20 outputs the first input signal in which the acoustic echo component is cancelled by the acoustic echo cancellation device 1. The second output terminal 21 outputs the second input signal in which the acoustic echo component is cancelled by the acoustic echo cancellation device 1.

The input terminal 14, the first output terminal 20, and the second output terminal 21 are connected to a communication part (not shown in the drawings). The communication part transmits the first input signal and the second input signal to the conversation device on the receiver side (not shown in the drawings) via a network, and receives the reproduced signal from the conversation device on the receiver side (not shown in the drawings) via the network. The network is, for example, the Internet.

The acoustic echo cancellation device 1 includes an adder 13, a first echo canceller 16, and a second echo canceller 17.

The adder 13 adds the first input signal from the first microphone 11 and the second input signal from the second microphone 12 to each other.

The first echo canceller 16 produces a first pseudo echo signal which indicates a component of the reproduced signal contained in the input signal using the input signal obtained from at least two microphones and the reproduced signal outputted to the speaker.

In the first embodiment, an input signal obtained from at least two microphones is an addition signal obtained by adding the first input signal from the first microphone 11 and the second input signal from the second microphone 12 to each other. That is, the first echo canceller 16 produces a first pseudo echo signal which indicates a component of the reproduced signal contained in the addition signal using the addition signal from the adder 13 and the reproduced signal.

The first echo canceller 16 includes an adaptive filter 161 and an error calculation part 162.

The adaptive filter 161 produces a first pseudo echo signal which indicates a component of the reproduced signal contained in the addition signal by convoluting the filter coefficient and the reproduced signal.

The error calculation part 162 calculates an error signal between an addition signal from the adder 13 and the first pseudo echo signal from the adaptive filter 161, and outputs the calculated error signal to the adaptive filter 161. The adaptive filter 161 modifies a filter coefficient based on the inputted error signal, and produces the first pseudo echo signal by convoluting the modified filter coefficient and the reproduced signal. The adaptive filter 161 modifies the filter coefficient such that the error signal is minimized using the adaptive algorithm. As the adaptive algorithm, for example, a normalized least mean square (NLMS) method, an affine projection (AP) method, or a recursive least square (RLS) method can be used.

The second echo canceller 17 produces a second pseudo echo signal which indicates a component of the first pseudo echo signal contained in at least one input signal using at least one input signal outputted from at least two microphones and the first pseudo echo signal produced by the first echo canceller 16, and cancels an acoustic echo component of at least one input signal using the produced second pseudo echo signal.

The second echo canceller 17 includes: a third echo canceller 18 which cancels an acoustic echo component of the first input signal; and a fourth echo canceller 19 which cancels an acoustic echo component of the second input signal. The first pseudo echo signal produced by the first echo canceller 16 is outputted to the third echo canceller 18 and the fourth echo canceller 19.

The third echo canceller 18 produces a third pseudo echo signal which indicates a component of the first pseudo echo signal contained in the first input signal using the first input signal and the first pseudo echo signal produced by the first echo canceller 16, and cancels an acoustic echo component of the first input signal using the produced third pseudo echo signal.

The third echo canceller 18 includes an adaptive filter 181 and an error calculation part 182.

The adaptive filter 181 produces a third pseudo echo signal which indicates a component of the first pseudo echo signal contained in the first input signal by convoluting a filter coefficient and the first pseudo echo signal.

The error calculation part 182 calculates an error signal between the first input signal from the first microphone 11 and the third pseudo echo signal from the adaptive filter 181, and outputs the calculated error signal to the adaptive filter 181. The adaptive filter 181 modifies a filter coefficient based on the inputted error signal, and produces the third pseudo echo signal by convoluting the modified filter coefficient and the first pseudo echo signal. The adaptive filter 181 modifies the filter coefficient such that the error signal is minimized using the adaptive algorithm. As the adaptive algorithm, for example, an NLMS method, an AP method, or an RLS method can be used.

The error calculation part 182 cancels an acoustic echo component from the first input signal by subtracting the third pseudo echo signal from the adaptive filter 181 from the first input signal from the first microphone 11. Accordingly, the error calculation part 182 outputs the first input signal in which the acoustic echo component is cancelled to the first output terminal 20.

The fourth echo canceller 19 produces a fourth pseudo echo signal which indicates a component of the first pseudo echo signal contained in the second input signal using the second input signal and the first pseudo echo signal produced by the first echo canceller 16, and cancels an acoustic echo component of the second input signal using the produced fourth pseudo echo signal.

The fourth echo canceller 19 includes an adaptive filter 191 and an error calculation part 192.

The adaptive filter 191 produces a fourth pseudo echo signal which indicates a component of the first pseudo echo signal contained in the second input signal by convoluting a filter coefficient and the first pseudo echo signal.

The error calculation part 192 calculates an error signal between the second input signal from the second microphone 12 and the fourth pseudo echo signal from the adaptive filter 191, and outputs the calculated error signal to the adaptive filter 191. The adaptive filter 191 modifies a filter coefficient based on the inputted error signal, and produces the fourth pseudo echo signal by convoluting the modified filter coefficient and the first pseudo echo signal. The adaptive filter 191 modifies the filter coefficient such that the error signal is minimized using the adaptive algorithm. As the adaptive algorithm, for example, an NLMS method, an AP method, or an RLS method can be used.

The error calculation part 192 cancels an acoustic echo component from the second input signal by subtracting the fourth pseudo echo signal from the adaptive filter 191 from the second input signal from the second microphone 12. Accordingly, the error calculation part 192 outputs the second input signal in which the acoustic echo component is cancelled to the second output terminal 21.

In the first embodiment, a filter length of the second echo canceller 17 is shorter than a filter length of the first echo canceller 16. That is, a filter length of the adaptive filter 181 of the third echo canceller 18 is shorter than a filter length of the adaptive filter 161 of the first echo canceller 16, and a filter length of the adaptive filter 191 of the fourth echo canceller 19 is shorter than a filter length of the adaptive filter 161 of the first echo canceller 16.

In the first embodiment, the conversation device includes two microphones. However, this disclosure is not particularly limited to such a case, and the conversation device may include three or more microphones. When the conversation device includes three or more microphones, the adder 13 adds respective input signals from three or more microphones, and the first echo canceller 16 outputs the first pseudo echo signal to echo cancellers which are provided to the respective three or more microphones.

In the first embodiment, the conversation device includes one speaker. However, this disclosure is not particularly limited to such a case, and the conversation device may include two or more speakers. In the case where the conversation device includes a plurality of speakers, it is necessary for the conversation device to include the same number of acoustic echo cancellation devices 1 as the plurality of speakers.

Next, an operation of the acoustic echo cancellation device 1 according to the first embodiment of this disclosure is described.

Figure 2:
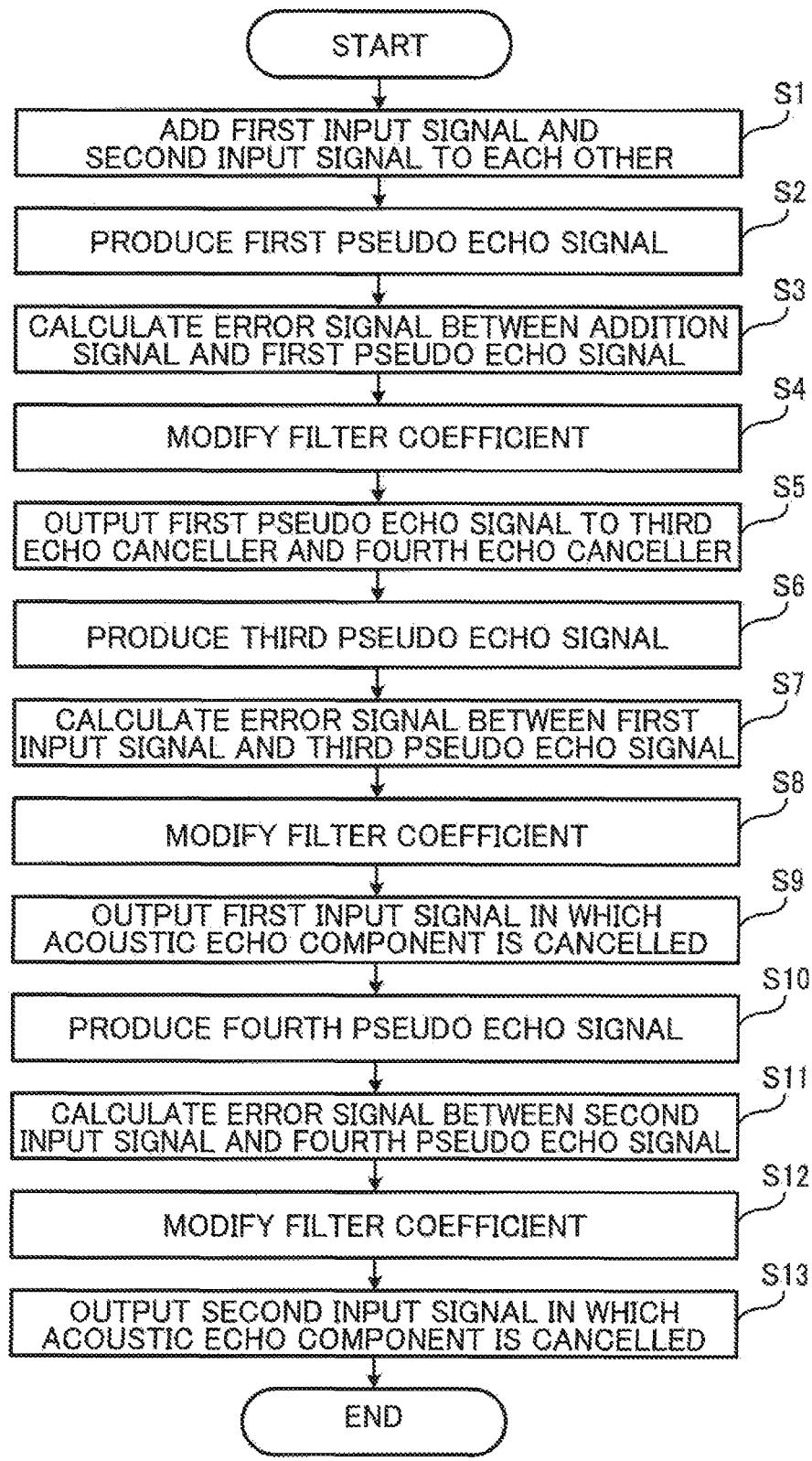
FIG. 2 is a flowchart for describing an operation of an acoustic echo cancellation device according to the first embodiment of this disclosure.

FIG. 2 is a flowchart for describing an operation of the acoustic echo cancellation device according to the first embodiment of this disclosure.

In step S1, the adder 13 adds a first input signal from the first microphone 11 and a second input signal from the second microphone 12 to each other. Due to such an operation, the first input signal from the first microphone 11 and the second input signal from the second microphone 12 are inputted to the adder 13.

Next, in step S2, the adaptive filter 161 of the first echo canceller 16 produces a first pseudo echo signal which indicates a component of a reproduced signal contained in an addition signal by convoluting a filter coefficient and the reproduced signal.

Next, in step S3, the error calculation part 162 calculates an error signal between the addition signal from the adder 13 and the first pseudo echo signal from the adaptive filter 161 by subtracting the first pseudo echo signal from the addition signal. The error calculation part 162 outputs the calculated error signal to the adaptive filter 161.

Next, in step S4, the adaptive filter 161 modifies a filter coefficient based on the error signal inputted from the error calculation part 162. The adaptive filter 161 produces the first pseudo echo signal by convoluting the modified filter coefficient and the reproduced signal.

Next, in step S5, the adaptive filter 161 outputs the produced first pseudo echo signal to the third echo canceller 18 and the fourth echo canceller 19.

Next, in step S6, the adaptive filter 181 of the third echo canceller 18 produces a third pseudo echo signal which indicates a component of the first pseudo echo signal contained in the first input signal by convoluting the filter coefficient and the first pseudo echo signal.

Next, in step S7, the error calculation part 182 calculates an error signal between the first input signal from the first microphone 11 and the third pseudo echo signal from the adaptive filter 181 by subtracting the third pseudo echo signal from the first input signal. The error calculation part 182 outputs the calculated error signal to the adaptive filter 181.

Next, in step S8, the adaptive filter 181 modifies a filter coefficient based on the error signal inputted from the error calculation part 182. The adaptive filter 181 produces the third pseudo echo signal by convoluting the modified filter coefficient and the first pseudo echo signal.

Next, in step S9, the error calculation part 182 outputs the first input signal in which the acoustic echo component is cancelled to the first output terminal 20. That is, the error calculation part 182 cancels an acoustic echo component from the first input signal by subtracting the third pseudo echo signal from the adaptive filter 181 from the first input signal from the first microphone 11.

Next, in step S10, the adaptive filter 191 of the fourth echo canceller 19 produces a fourth pseudo echo signal which indicates a component of the first pseudo echo signal contained in the second input signal by convoluting the filter coefficient and the first pseudo echo signal.

Next, in step S11, the error calculation part 192 calculates an error signal between the second input signal from the second microphone 12 and the fourth pseudo echo signal from the adaptive filter 191 by subtracting the fourth pseudo echo signal from the second input signal. The error calculation part 192 outputs the calculated error signal to the adaptive filter 191.

Next, in step S12, the adaptive filter 191 modifies a filter coefficient based on the error signal inputted from the error calculation part 192. The adaptive filter 191 produces the fourth pseudo echo signal by convoluting the modified filter coefficient and the first pseudo echo signal.

Next, in step S13, the error calculation part 192 outputs the second input signal in which the acoustic echo component is cancelled to the second output terminal 21. That is, the error calculation part 192 cancels an acoustic echo component from the second input signal by subtracting the fourth pseudo echo signal from the adaptive filter 191 from the second input signal from the second microphone 12.

In an initial stage where the acoustic echo cancellation device 1 starts its operation, the filter coefficient is not sufficiently modified. Accordingly, an acoustic echo component cannot be sufficiently cancelled from the first input signal and the second input signal. However, by repeatedly performing processing in step S1 to step S13, the filter coefficient is sufficiently modified and hence, the acoustic echo component can be sufficiently cancelled from the first input signal and the second input signal.

In this manner, the first echo canceller 16 produces the first pseudo echo signal which indicates a component of the reproduced signal contained in the input signals obtained from at least two microphones, and the second echo canceller 17 produces a second pseudo echo signal which indicates a component of the first pseudo echo signal contained in at least one input signal, and cancels an acoustic echo component of at least one input signal using the produced second pseudo echo signal.

Accordingly, the second pseudo echo signal is produced using the already produced first pseudo echo signal. Accordingly, a filter length (tap length) of the adaptive filter used in producing the second pseudo echo signal can be shortened and hence, a conversation performance can be maintained and, at the same time, an arithmetic amount for removing an acoustic echo can be reduced.

Particularly, echo cancelling processing by the echo canceller on a first stage (first echo canceller 16) has substantially the same filter length (arithmetic amount) compared to the prior art. However, echo cancelling processing by the echo cancellers on the second stage and succeeding stages (the third echo canceller 18 and the fourth echo canceller 19) uses the already produced first pseudo echo signal and hence, can have a short filter length compared to the prior art. As a result, an arithmetic amount can be reduced compared to the prior art. Accordingly, the larger the number of microphone becomes, the smaller an arithmetic amount becomes compared to the prior art.

In the first embodiment, the first echo canceller 16 produces a first pseudo echo signal using an addition signal obtained by adding a first input signal from the first microphone 11 and a second input signal from the second microphone 12 and a reproduced signal transmitted to the speaker 15. In this case, it is considered that an acoustic echo inputted to a virtual microphone disposed at an intermediate position between the first microphone 11 and the second microphone 12 from the speaker 15 is estimated. The third echo canceller 18 produces a third pseudo echo signal using a first pseudo echo signal produced by the first echo canceller 16. In this case, it is considered that an acoustic echo corresponding to a differential between the position of a virtual microphone and the position of the first microphone 11 is estimated. Accordingly, a filter length of the adaptive filter 181 of the third echo canceller 18 can be set largely shorter than a filter length of the adaptive filter 161 of the first echo canceller 16. In the same manner, a filter length of the adaptive filter 191 of the fourth echo canceller 19 can be set largely shorter than the filter length of the adaptive filter 161 of the first echo canceller 16.

For example, arithmetic amounts of the third echo canceller 18 and the fourth echo canceller 19 can be reduced to approximately one tenth of an arithmetic amount of the first echo canceller 16. Accordingly, a total arithmetic amount of the first echo canceller 16, the third echo canceller 18, and the fourth echo canceller 19 can be set sufficiently small compared to a total arithmetic amount in the case where two echo cancellers having the same arithmetic amount as the first echo canceller 16 are provided to the first microphone 11 and the second microphone 12 respectively.

Further, the arrangement positions of the plurality of microphones differ from each other. Accordingly, a waveform of a reflected wave (echo signal) inputted as an acoustic echo differs between the plurality of microphones. In the case where a phase of an echo signal is opposite to a phase of an input signal which is a voice of a talker, when the echo signal is added to the input signal, the input signal is eliminated. Accordingly, it is difficult to cancel an acoustic echo of the input signal. However, in the first embodiment, a first input signal and a second input signal from at least two microphones are added and hence, an effect of loss of a signal caused by interference of acoustic echoes can be reduced.

In the first embodiment, a reproduced signal in a time domain and an addition signal in a time domain are inputted to the first echo canceller 16, and a first input signal in a time domain, a second input signal in the time domain, and a first pseudo echo signal in the time domain are inputted to the second echo canceller 17. However, this disclosure is not particularly limited to such a case. A reproduced signal in a frequency domain and an addition signal in the frequency domain may be inputted to the first echo canceller 16, and a first input signal in the frequency domain, a second input signal in the frequency domain, and a first pseudo echo signal in the frequency domain may be inputted to the second echo canceller 17. Hereinafter, a modification 1 of the first embodiment is described.

Figure 3:
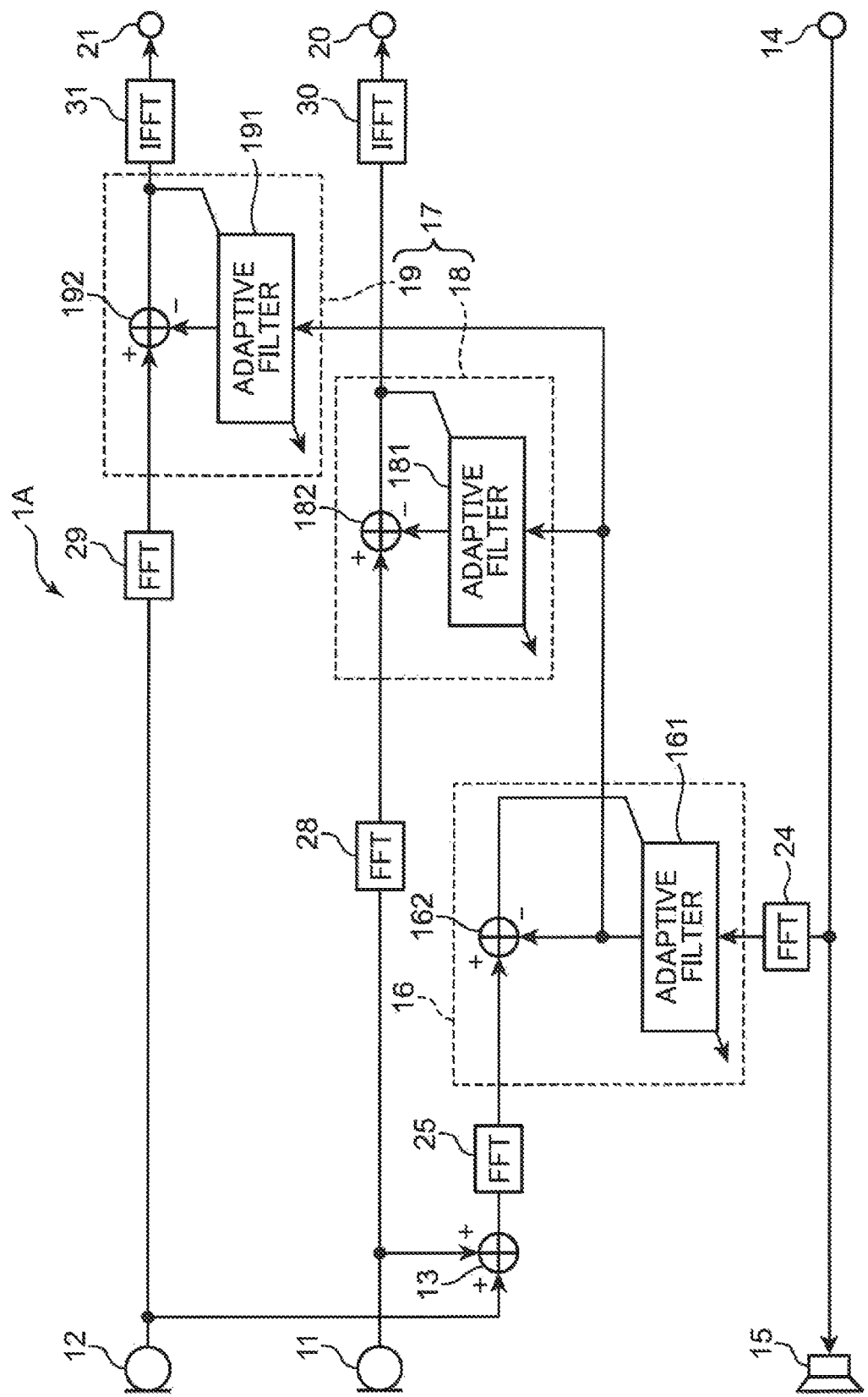
FIG. 3 is a view showing a configuration of a conversation device according to a modification 1 of the first embodiment of this disclosure.

FIG. 3 is a view showing the configuration of a conversation device according to the modification 1 of the first embodiment of this disclosure.

The conversation device shown in FIG. 3 includes an acoustic echo cancellation device 1A, a first microphone 11, a second microphone 12, an input terminal 14, a speaker 15, a first output terminal 20, and a second output terminal 21. In the modification 1 of the first embodiment, constitutional elements equal to the corresponding constitutional elements of the first embodiment are given the same symbols, and the description of these constitutional elements is omitted.

The acoustic echo cancellation device 1A includes an adder 13, a first echo canceller 16, a second echo canceller 17, fast Fourier transform parts 24, 25, 28, 29, and inverse fast Fourier transform parts 30, 31.

The fast Fourier transform parts 24, 25, 28, 29 perform a discrete Fourier transform at a high speed. The fast Fourier transform part 24 transforms a reproduced signal in a time domain inputted to the first echo canceller 16 into a reproduced signal in a frequency domain. The fast Fourier transform part 25 transforms an addition signal (input signal) in a time domain inputted from the adder 13 to the first echo canceller 16 into an addition signal (input signal) in a frequency domain.

The fast Fourier transform part 28 coverts a first input signal (at least one input signal) in a time domain inputted from the first microphone 11 to a third echo canceller 18 into a first input signal (at least one input signal) in a frequency domain. The fast Fourier transform part 29 transforms a second input signal (at least one input signal) in a time domain inputted from the second microphone 12 to a fourth echo canceller 19 into a second input signal (at least one input signal) in a frequency domain.

The inverse fast Fourier transform parts 30, 31 perform an inverse discrete Fourier transform at a high speed. The inverse fast Fourier transform part 30 transforms a first input signal in a frequency domain inputted from the third echo canceller 18 to the first output terminal 20 into a first input signal in a time domain. The inverse fast Fourier transform part 31 transforms a second input signal in a frequency domain inputted from the fourth echo canceller 19 to the second output terminal 21 into a second input signal in a time domain.

The first echo canceller 16 produces a first pseudo echo signal in a frequency domain using an addition signal in a frequency domain and a reproduced signal in a frequency domain.

The third echo canceller 18 produces a third pseudo echo signal in a frequency domain using a first input signal in a frequency domain and a first pseudo echo signal in a frequency domain, and cancels an acoustic echo component of the first input signal in a frequency domain using the produced third pseudo echo signal in the frequency domain.

The fourth echo canceller 19 produces a fourth pseudo echo signal in a frequency domain using a second input signal in a frequency domain and a first pseudo echo signal in a frequency domain, and cancels an acoustic echo component of the second input signal in the frequency domain using the produced fourth pseudo echo signal in the frequency domain.

In the modification 1 of the first embodiment, adaptive filters 161, 181, 191 can use an adaptive algorithm in a frequency domain, and a convolution operation can be performed by multiplication and hence, an arithmetic amount can be further reduced.

In the first embodiment, depending on the arrangement position of the first microphone 11, there is a concern that a time difference occurs between a first input signal from the first microphone 11 and a first pseudo echo signal produced by the first echo canceller 16. For example, in the case where a sound from a speaker 15 is inputted to the first microphone 11, there is a concern that a first input signal from the first microphone 11 contains an echo signal faster in time than a first pseudo echo signal produced by the first echo canceller 16. In this case, theoretically, there is a concern that the third echo canceller 18 cannot estimate the echo signal contained in the first input signal using the first pseudo echo signal. In view of the above, the acoustic echo cancellation device may further include a delay part which delays at least one input signal outputted from at least two microphones. Hereinafter, a modification 2 of the first embodiment is described.

Figure 10:
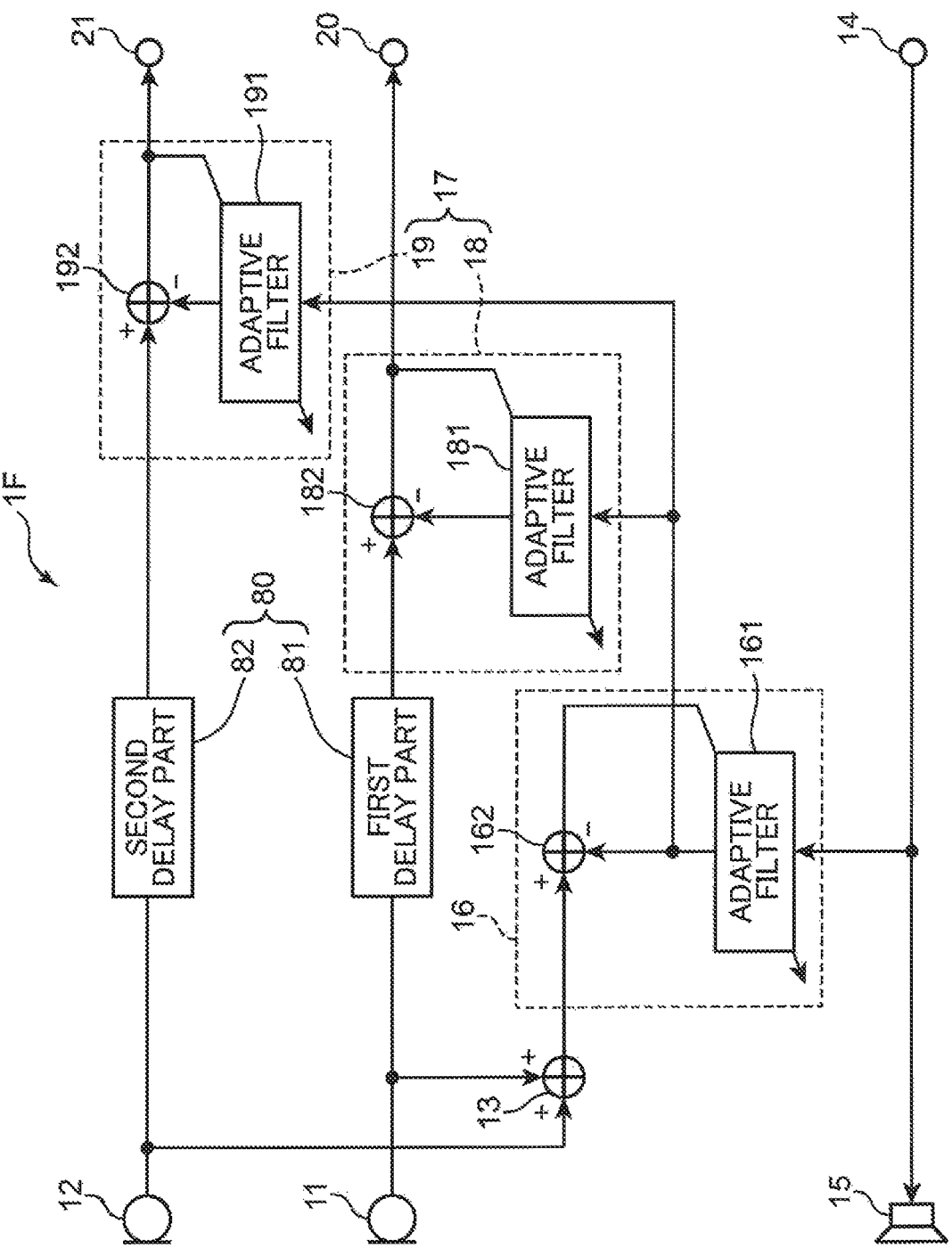
FIG. 10 is a view showing a configuration of a conversation device according to a modification 2 of the first embodiment of this disclosure.

FIG. 10 is a view showing the configuration of a conversation device according to a modification 2 of the first embodiment of this disclosure.

The conversation device shown in FIG. 10 includes an acoustic echo cancellation device 1F, a first microphone 11, a second microphone 12, an input terminal 14, a speaker 15, a first output terminal 20, and a second output terminal 21. In the modification 2 of the first embodiment, constitutional elements equal to the corresponding constitutional elements of the first embodiment are given the same symbols, and the description of these constitutional elements is omitted.

The acoustic echo cancellation device 1F includes an adder 13, a first echo canceller 16, a second echo canceller 17, and a delay part 80.

The delay part 80 delays at least one input signal outputted from at least two microphones. The delay part 80 includes a first delay part 81 and a second delay part 82.

The first delay part 81 is disposed between the first microphone 11 and a third echo canceller 18. The first delay part 81 delays a first input signal from the first microphone 11.

The second delay part 82 is disposed between the second microphone 12 and a fourth echo canceller 19. The second delay part 82 delays a second input signal from the second microphone 12.

The second echo canceller 17 produces a second pseudo echo signal which indicates a component of a first pseudo echo signal contained in at least one delayed input signal using at least one delayed input signal and the first pseudo echo signal produced by the first echo canceller 16, and cancels an acoustic echo component of at least one delayed input signal using the produced second pseudo echo signal.

The third echo canceller 18 produces a third pseudo echo signal which indicates a component of a first pseudo echo signal contained in a delayed first input signal using the delayed first input signal and the first pseudo echo signal produced by the first echo canceller 16, and cancels an acoustic echo component of the delayed first input signal using the produced third pseudo echo signal.

The fourth echo canceller 19 produces a fourth pseudo echo signal which indicates a component of a first pseudo echo signal contained in a delayed second input signal using the delayed second input signal and the first pseudo echo signal produced by the first echo canceller 16, and cancels an acoustic echo component of the delayed second input signal using the produced fourth pseudo echo signal.

In the modification 2 of the first embodiment, a first input signal delayed by the first delay part 81 is inputted to the third echo canceller 18, and a second input signal delayed by the second delay part 82 is inputted to the fourth echo canceller 19. Accordingly, a time difference between the first pseudo echo signal produced by the first echo canceller 16 and the first input signal is eliminated, and a time difference between the first pseudo echo signal and the second input signal is eliminated and hence, it is possible to produce a third pseudo echo signal and a fourth pseudo echo signal with certainty.

In the modification 1 of the first embodiment, the acoustic echo cancellation device 1A may include the first delay part 81 between the first microphone 11 and the fast Fourier transform part 28, and may include the second delay part 82 between the second microphone 12 and the fast Fourier transform part 29.

In the first embodiment, the adder 13 adds a first input signal from the first microphone 11 and a second input signal from the second microphone 12 to each other, and the first echo canceller 16 produces a first pseudo echo signal which indicates a component of a reproduced signal contained in an addition signal using the addition signal and the reproduced signal. However, this disclosure is not particularly limited to such a case, and the acoustic echo cancellation device 1 may further include an averaging processing part which averages the addition signal from the adder 13. In this case, the first echo canceller 16 may produce a first pseudo echo signal which indicates a component of a reproduced signal contained in an averaging signal using the averaging signal from the averaging processing part and the reproduced signal.

Second Embodiment

In the first embodiment, a first pseudo echo signal produced by the first echo canceller is outputted to the third echo canceller and the fourth echo canceller, the third echo canceller cancels an acoustic echo component of a first input signal using the first pseudo echo signal, and the fourth echo canceller cancels an acoustic echo component of a second input signal using the first pseudo echo signal. On the other hand, in the second embodiment, the first echo canceller produces a first pseudo echo signal, cancels an acoustic echo component of a first input signal using the first pseudo echo signal, and the second echo canceller cancels an acoustic echo component of a second input signal using the first pseudo echo signal.

Figure 4:
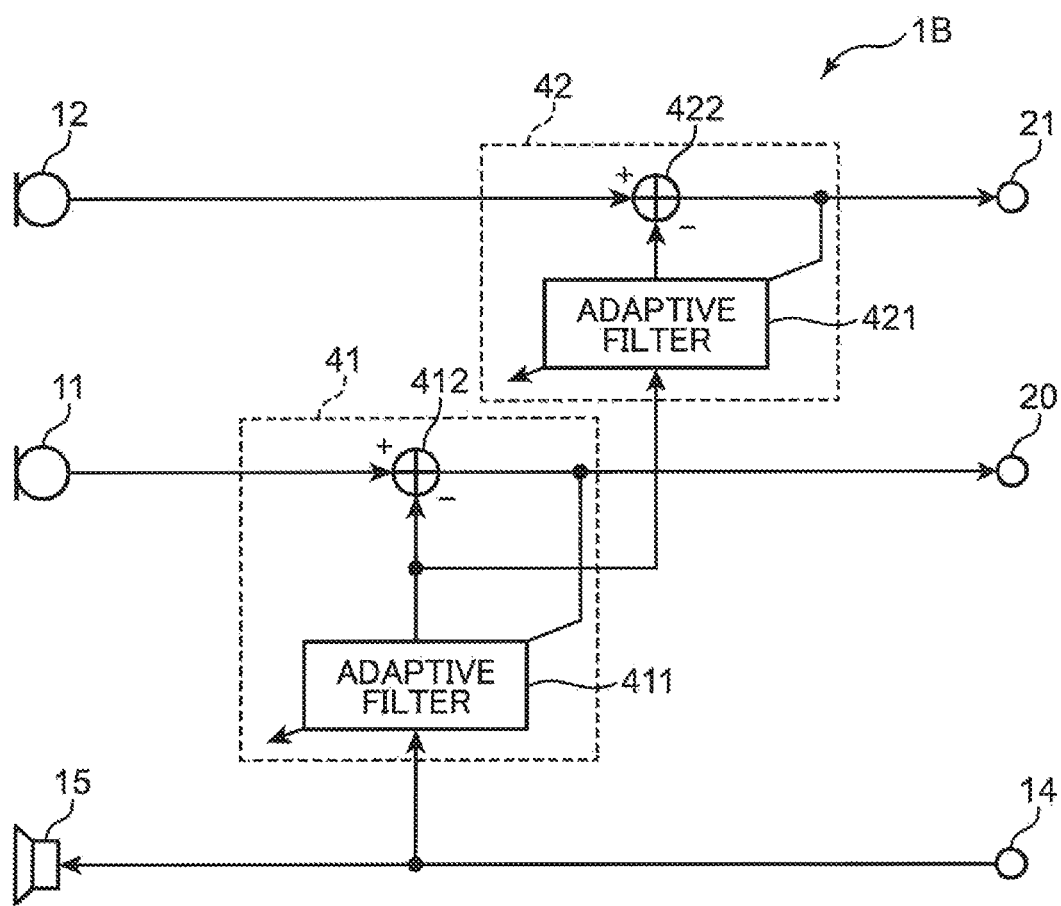
FIG. 4 is a view showing a configuration of a conversation device according to a second embodiment of this disclosure.

FIG. 4 is a view showing the configuration of a conversation device according to the second embodiment of this disclosure.

The conversation device shown in FIG. 4 includes an acoustic echo cancellation device 1B, a first microphone 11, a second microphone 12, an input terminal 14, a speaker 15, a first output terminal 20, and a second output terminal 21. In the second embodiment, constitutional elements equal to the corresponding constitutional elements of the first embodiment are given the same symbols, and the description of these constitutional elements is omitted.

The acoustic echo cancellation device 1B includes a first echo canceller 41 and a second echo canceller 42.

The first echo canceller 41 produces a first pseudo echo signal which indicates a component of a reproduced signal contained in an input signal using an input signal obtained from at least two microphones and a reproduced signal outputted to the speaker.

It is preferable that the first echo canceller 41 produce a first pseudo echo signal with respect to the microphone disposed at the position closest to the speaker 15. In this case, the first echo canceller 41 produces a first pseudo echo signal which indicates a component of a reproduced signal contained in an input signal using the input signal outputted from the microphone disposed at the position closest to the speaker 15 and the reproduced signal. In the second embodiment, the microphone disposed at the position closest to the speaker 15 is the first microphone 11.

In the second embodiment, an input signal obtained from at least two microphones is a first input signal from the first microphone 11. That is, the first echo canceller 41 produces a first pseudo echo signal which indicates a component of a reproduced signal contained in the first input signal using the first input signal and the reproduced signal. Further, the first echo canceller 41 cancels an acoustic echo component of the first input signal using the produced first pseudo echo signal.

The first echo canceller 41 includes an adaptive filter 411 and an error calculation part 412. The adaptive filter 411 produces a first pseudo echo signal which indicates a component of a reproduced signal contained in a first input signal by convoluting a filter coefficient and the reproduced signal.

The error calculation part 412 calculates an error signal between the first input signal from the first microphone 11 and the first pseudo echo signal from the adaptive filter 411, and outputs a calculated error signal to the adaptive filter 411. The adaptive filter 411 modifies a filter coefficient based on an inputted error signal, and produces a first pseudo echo signal by convoluting a modified filter coefficient and a reproduced signal. The adaptive filter 411 modifies the filter coefficient such that the error signal is minimized using an adaptive algorithm. As the adaptive algorithm, for example, an NLMS method, an AP method, or an RLS method can be used.

The error calculation part 412 cancels an acoustic echo component from a first input signal by subtracting a first pseudo echo signal from the adaptive filter 411 from a first input signal from the first microphone 11. Accordingly, the error calculation part 412 outputs a first input signal in which an acoustic echo component is cancelled to the first output terminal 20.

A first pseudo echo signal produced by the first echo canceller 41 is outputted to the second echo canceller 42.

The second echo canceller 42 produces a second pseudo echo signal which indicates a component of a first pseudo echo signal contained in a second input signal using a second input signal and a first pseudo echo signal produced by the first echo canceller 41, and cancels an acoustic echo component of a second input signal using a produced second pseudo echo signal.

The second echo canceller 42 includes an adaptive filter 421 and an error calculation part 422.

The adaptive filter 421 produces a second pseudo echo signal which indicates a component of the first pseudo echo signal contained in the second input signal by convoluting a filter coefficient and the first pseudo echo signal.

The error calculation part 422 calculates an error signal between a second input signal from a second microphone 12 and the second pseudo echo signal from the adaptive filter 421, and outputs the calculated error signal to the adaptive filter 421. The adaptive filter 421 modifies a filter coefficient based on an inputted error signal, and produces a second pseudo echo signal by convoluting a modified filter coefficient and a first pseudo echo signal. The adaptive filter 421 modifies a filter coefficient such that an error signal is minimized using an adaptive algorithm. As the adaptive algorithm, for example, an NLMS method, an AP method, or an RLS method can be used.

The error calculation part 422 cancels an acoustic echo component from a second input signal by subtracting a second pseudo echo signal from the adaptive filter 421 from a second input signal from the second microphone 12. Accordingly, the error calculation part 422 outputs a second input signal in which an acoustic echo component is cancelled to the second output terminal 21.

In the second embodiment, the conversation device includes two microphones. However, this disclosure is not particularly limited to such a case, and the conversation device may include three or more microphones. When the conversation device includes three or more microphones, the first echo canceller 41 outputs a first pseudo echo signal to echo cancellers which are provided to the respective microphones other than the first microphone 11.

In the second embodiment, the conversation device includes one speaker. However, this disclosure is not particularly limited to such a case, and the conversation device may include two or more speakers. In the case where the conversation device includes a plurality of speakers, it is necessary for the conversation device to include the same number of acoustic echo cancellation devices 1B as the plurality of speakers.

Next, an operation of the acoustic echo cancellation device 1B according to the second embodiment of this disclosure is described.

Figure 5:
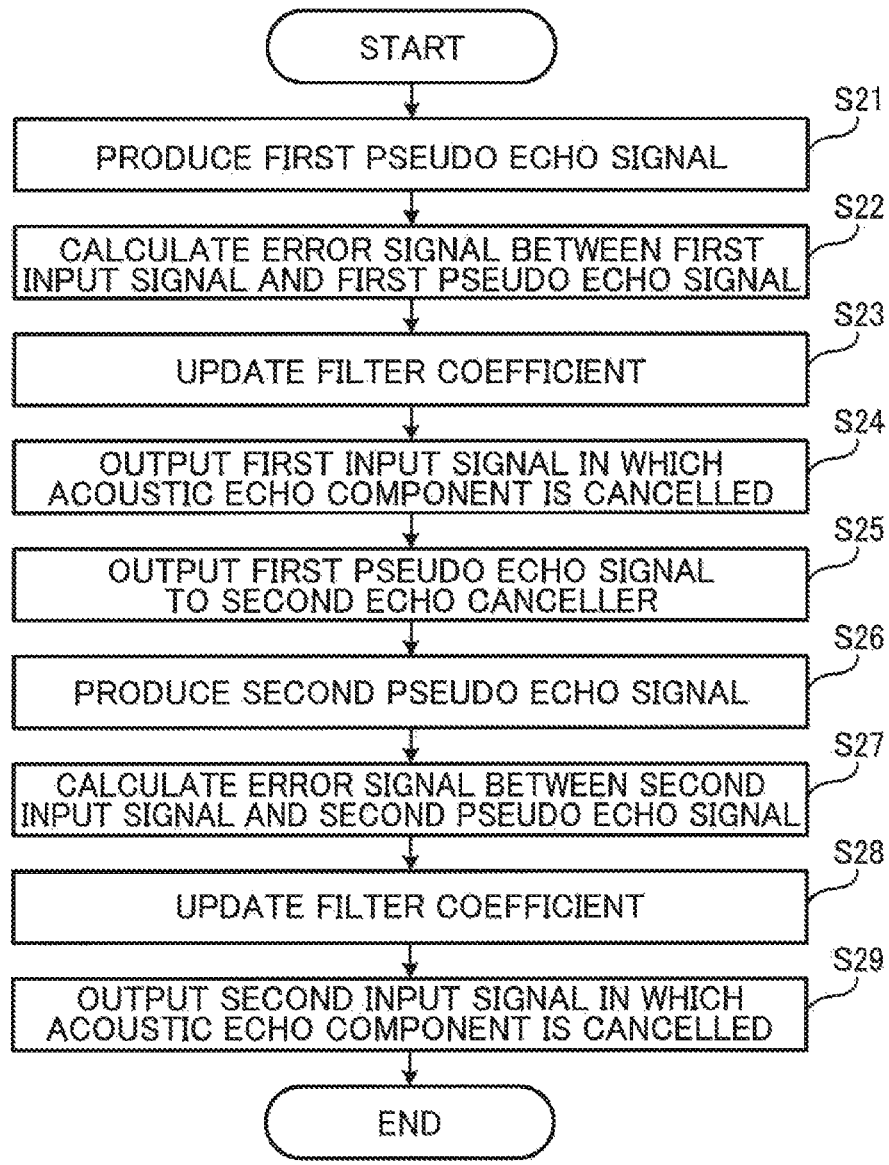
FIG. 5 is a flowchart for describing an operation of an acoustic echo cancellation device according to the second embodiment of this disclosure.

FIG. 5 is a flowchart for describing an operation of the acoustic echo cancellation device according to the second embodiment of this disclosure.

First, in step S21, the adaptive filter 411 of the first echo canceller 41 produces a first pseudo echo signal which indicates a component of a reproduced signal contained in a first input signal by convoluting a filter coefficient and the reproduced signal.

Next, in step S22, the error calculation part 412 calculates an error signal between a first input signal from the first microphone 11 and a first pseudo echo signal from the adaptive filter 411 by subtracting the first pseudo echo signal from the first input signal. The error calculation part 412 outputs the calculated error signal to the adaptive filter 411.

Next, in step S23, the adaptive filter 411 modifies a filter coefficient based on an error signal inputted from the error calculation part 412. The adaptive filter 411 produces a first pseudo echo signal by convoluting a modified filter coefficient and a reproduced signal.

Next, in step S24, the error calculation part 412 outputs a first input signal in which an acoustic echo component is cancelled to the first output terminal 20. That is, the error calculation part 412 cancels an acoustic echo component from a first input signal by subtracting a first pseudo echo signal from the adaptive filter 411 from a first input signal from the first microphone 11.

Next, in step S25, the adaptive filter 411 outputs a produced first pseudo echo signal to a second echo canceller 42.

Next, in step S26, the adaptive filter 421 of the second echo canceller 42 produces a second pseudo echo signal which indicates a component of the first pseudo echo signal contained in the second input signal by convoluting a filter coefficient and a first pseudo echo signal.

Next, in step S27, the error calculation part 422 calculates an error signal between a second input signal from the second microphone 12 and a second pseudo echo signal from the adaptive filter 421 by subtracting the second pseudo echo signal from the second input signal. The error calculation part 422 outputs the calculated error signal to the adaptive filter 421.

Next, in step S28, the adaptive filter 421 modifies a filter coefficient based on the error signal inputted from the error calculation part 422. The adaptive filter 421 produces the second pseudo echo signal by convoluting the modified filter coefficient and the first pseudo echo signal.

Next, in step S29, the error calculation part 422 outputs the second input signal in which the acoustic echo component is cancelled to the second output terminal 21. That is, the error calculation part 422 cancels an acoustic echo component from the second input signal by subtracting the second pseudo echo signal from the adaptive filter 421 from the second input signal from the second microphone 12.

In an initial stage where the acoustic echo cancellation device 1B starts its operation, the filter coefficient is not sufficiently modified. Accordingly, an acoustic echo component cannot be sufficiently cancelled from the first input signal and the second input signal. However, by repeatedly performing processing in step S21 to step S29, the filter coefficient is sufficiently modified and hence, the acoustic echo component can be sufficiently cancelled from the first input signal and the second input signal.

In this manner, the first echo canceller 41 produces the first pseudo echo signal which indicates a component of the reproduced signal contained in the first input signal obtained from the first microphone 11, and cancels the acoustic echo component of the first input signal using the produced first pseudo echo signal, and the second echo canceller 42 produces a second pseudo echo signal which indicates a component of the first pseudo echo signal contained in the second input signal, and cancels an acoustic echo component of the second input signal using the produced second pseudo echo signal.

Accordingly, the second pseudo echo signal is produced using the already produced first pseudo echo signal. Accordingly, a filter length (tap length) of the adaptive filter used in producing the second pseudo echo signal can be shortened and hence, a conversation performance can be maintained and, at the same time, an arithmetic amount for removing an acoustic echo can be reduced.

Particularly, echo cancelling processing by the echo canceller on a first stage (first echo canceller 41) has substantially the same filter length (arithmetic amount) compared to the prior art. However, echo cancelling processing by the echo cancellers on the second stage and succeeding stages (second echo canceller 42) uses the already produced first pseudo echo signal and hence, can have a short filter length compared to the prior art. As a result, an arithmetic amount can be reduced compared to the prior art. Accordingly, the larger the number of microphone becomes, the smaller an arithmetic amount becomes compared to the prior art.

In the second embodiment, the first echo canceller 41 produces a first pseudo echo signal using a first input signal from the first microphone 11 and the reproduced signal transmitted to the speaker 15. In this case, it is considered that an acoustic echo inputted to the first microphone 11 from the speaker 15 is estimated. The second echo canceller 42 produces a second pseudo echo signal using a first pseudo echo signal produced by the first echo canceller 16. In this case, it is considered that an acoustic echo corresponding to a differential between the position of the first microphone 11 and the position of the second microphone 12 is estimated. Accordingly, a filter length of the adaptive filter 421 of the second echo canceller 42 can be set largely shorter than a filter length of the adaptive filter 411 of the first echo canceller 41.

For example, an arithmetic amount of the second echo canceller 42 can be reduced to approximately one tenth of an arithmetic amount of the first echo canceller 41. Accordingly, a total arithmetic amount of the first echo canceller 41 and the second echo canceller 42 can be set sufficiently small compared to a total arithmetic amount in the case where two echo cancellers having the same arithmetic amount as the first echo canceller 41 are provided to the first microphone 11 and the second microphone 12 respectively.

In the second embodiment, the acoustic echo cancellation device 1B may include a delay part between the second microphone 12 and the second echo canceller 42.

In the second embodiment, a reproduced signal in a time domain and a first input signal in a time domain are inputted to the first echo canceller 41, and a second input signal in the time domain and a first pseudo echo signal in the time domain are inputted to the second echo canceller 42. However, this disclosure is not particularly limited to such a case. A reproduced signal in a frequency domain and a first input signal in a frequency domain may be inputted to the first echo canceller 41, and a second input signal in a frequency domain and a first pseudo echo signal in a frequency domain may be inputted to the second echo canceller 42. Hereinafter, a modification of the second embodiment is described.

Figure 6:
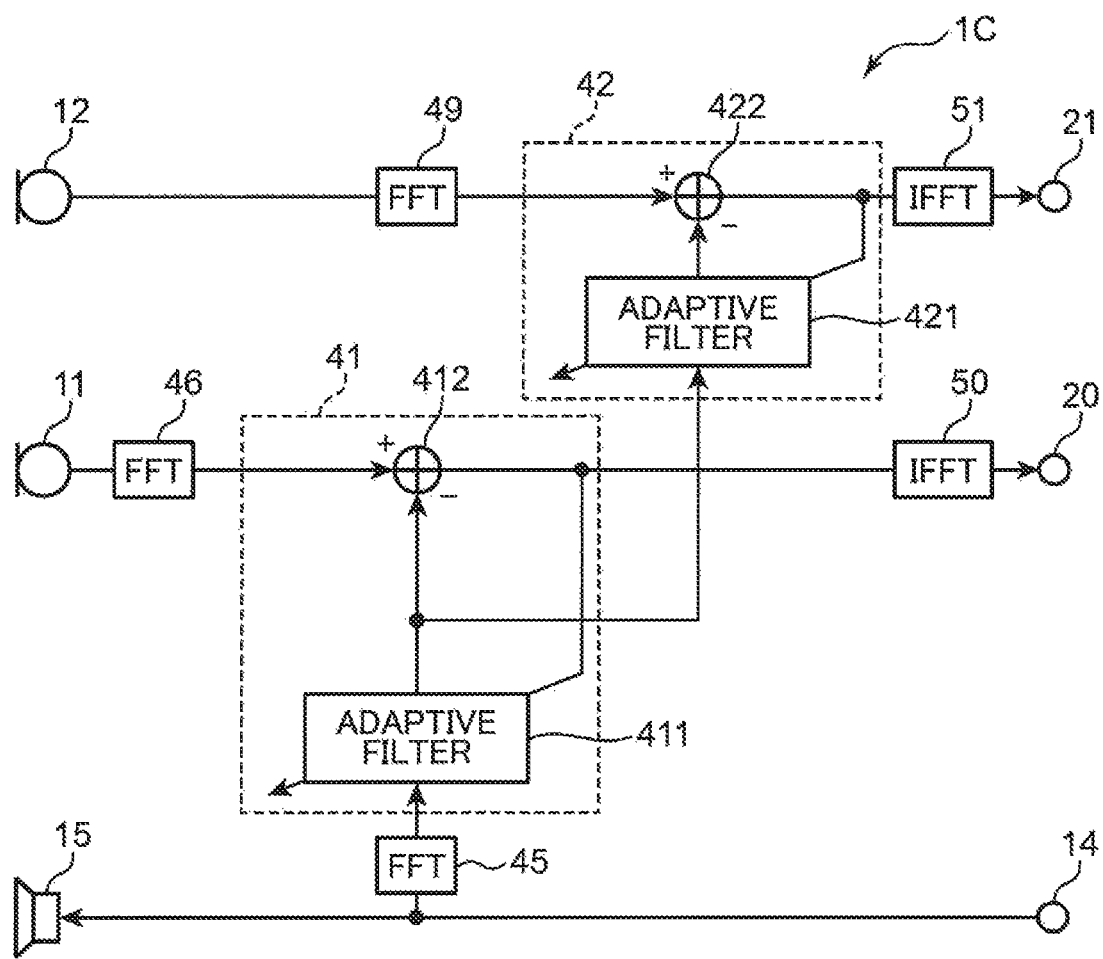
FIG. 6 is a view showing the configuration of a conversation device according to a modification of the second embodiment of this disclosure.

FIG. 6 is a view showing the configuration of a conversation device according to a modification of the second embodiment of this disclosure.

The conversation device shown in FIG. 6 includes an acoustic echo cancellation device 1C, a first microphone 11, a second microphone 12, an input terminal 14, a speaker 15, a first output terminal 20, and a second output terminal 21. In the modification of the second embodiment, constitutional elements equal to the corresponding constitutional elements of the second embodiment are given the same symbols, and the description of these constitutional elements is omitted.

The acoustic echo cancellation device 1C includes a first echo canceller 41, a second echo canceller 42, fast Fourier transform parts 45, 46, 49, and inverse fast Fourier transform parts 50, 51.

The fast Fourier transform parts 45, 46, 49 perform a discrete Fourier transform at a high speed. The fast Fourier transform part 45 transforms a reproduced signal in a time domain inputted to the first echo canceller 41 into a reproduced signal in a frequency domain. The fast Fourier transform part 46 transforms a first input signal in a time domain inputted from the first microphone 11 to the first echo canceller 41 into a first input signal in a frequency domain. The fast Fourier transform part 49 transforms a second input signal in a time domain inputted from the second microphone 12 to the second echo canceller 42 into a second input signal in a frequency domain.

The inverse fast Fourier transform parts 50, 51 perform an inverse discrete Fourier transform at a high speed. The inverse fast Fourier transform part 50 transforms a first input signal in a frequency domain inputted from the first echo canceller 41 to the first output terminal 20 into a first input signal in a time domain. The inverse fast Fourier transform part 51 transforms a second input signal in a frequency domain inputted from the second echo canceller 42 to the second output terminal 21 into a second input signal in a time domain.

The first echo canceller 41 produces a first pseudo echo signal in a frequency domain using a first input signal in a frequency domain and a reproduced signal in a frequency domain, and cancels an acoustic echo component of the first input signal in a frequency domain using the produced first pseudo echo signal in a frequency domain.

The second echo canceller 42 produces a second pseudo echo signal in a frequency domain using the second input signal in a frequency domain and the first pseudo echo signal in a frequency domain, and cancels an acoustic echo component of the second input signal in a frequency domain using the produced second pseudo echo signal in a frequency domain.

In the modification of the second embodiment, adaptive filters 411, 421 can use an adaptive algorithm in a frequency domain, and a convolution operation can be performed by multiplication and hence, an arithmetic amount can be further reduced.

In the modification of the second embodiment, the acoustic echo cancellation device 1C may include a delay part between the second microphone 12 and the fast Fourier transform part 49.

Third Embodiment

In the first embodiment, the first echo canceller produces a first pseudo echo signal which indicates a component of a reproduced signal contained in an addition signal using the addition signal from the adder and the reproduced signal. On the other hand, in the third embodiment, the first echo canceller calculates a first error signal which indicates an error between a first input signal and a first pseudo echo signal, calculates a second error signal which indicates an error between a second input signal and a first pseudo echo signal, averages an addition signal obtained by adding the first error signal and the second error signal to each other, and produces the first pseudo echo signal which indicates a component of a reproduced signal contained in the average signal using the average signal and the reproduced signal.

Figure 7:
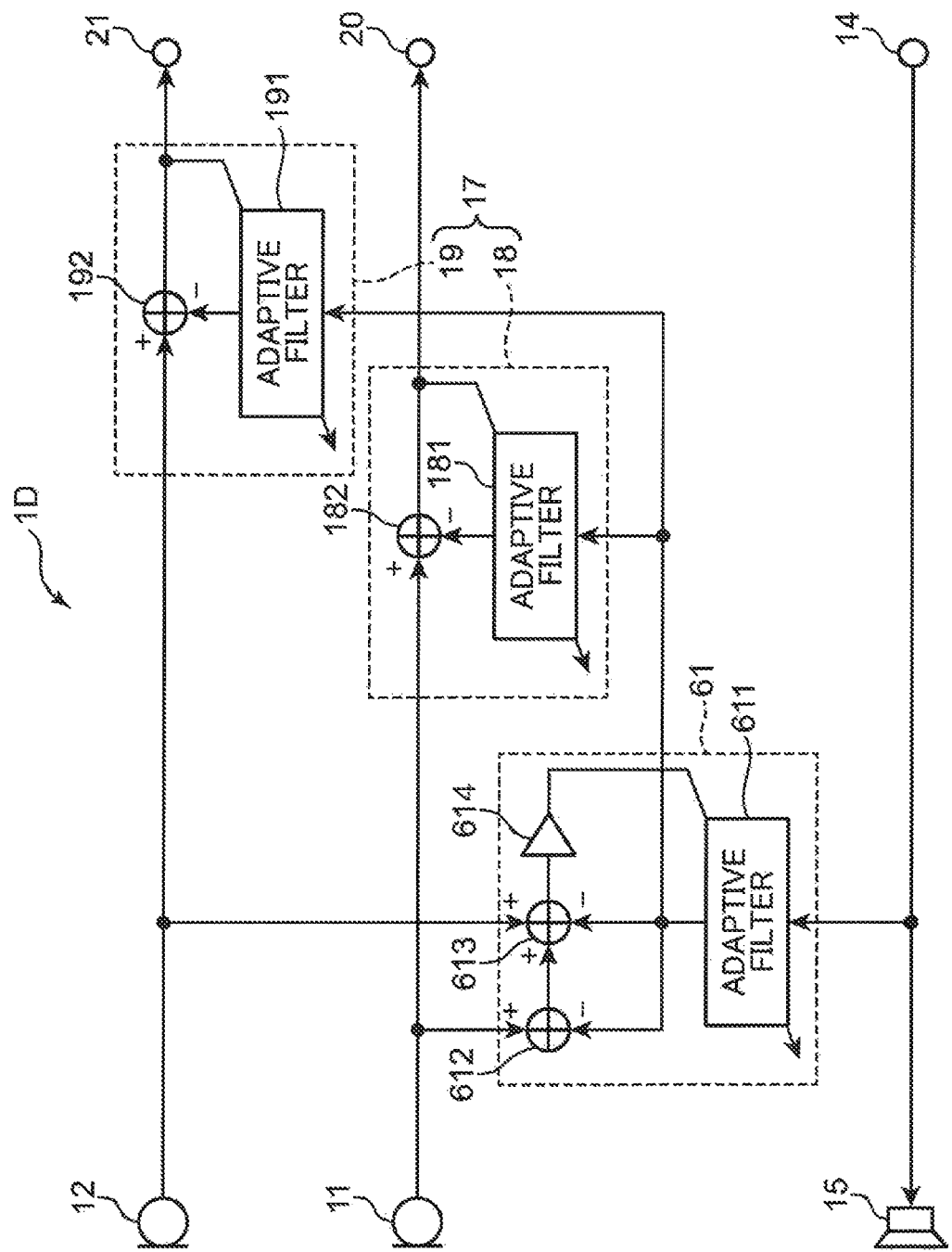
FIG. 7 is a view showing a configuration of a conversation device according to a third embodiment of this disclosure.

FIG. 7 is a view showing the configuration of a conversation device according to the third embodiment of this disclosure.

The conversation device shown in FIG. 7 includes an acoustic echo cancellation device 1D, a first microphone 11, a second microphone 12, an input terminal 14, a speaker 15, a first output terminal 20, and a second output terminal 21. In the third embodiment, constitutional elements equal to the corresponding constitutional elements of the first embodiment are given the same symbols, and the description of these constitutional elements is omitted.

The acoustic echo cancellation device 1D includes a first echo canceller 61, and a second echo canceller 17.

The first echo canceller 61 produces a first pseudo echo signal which indicates a component of the reproduced signal contained in the input signal using an input signal obtained from at least two microphones and a reproduced signal outputted to the speaker.

In the third embodiment, an input signal obtained from at least two microphones is an average signal obtained by averaging an addition signal which is obtained by adding a first error signal which indicates an error between a first input signal and a first pseudo echo signal and a second error signal which indicates an error between a second input signal and the first pseudo echo signal to each other. That is, the first echo canceller 61 produces a first pseudo echo signal which indicates a component of a reproduced signal contained in an average signal using an average signal and the reproduced signal.

The first echo canceller 61 includes an adaptive filter 611, a first error calculation part 612, a second error calculation part 613, and an averaging processing part 614.

The adaptive filter 611 produces a first pseudo echo signal which indicates a component of a reproduced signal contained in an average signal by convoluting a filter coefficient and the reproduced signal.

The first error calculation part 612 calculates a first error signal which indicates an error between a first input signal and a first pseudo echo signal. The first error calculation part 612 outputs the calculated first error signal to the second error calculation part 613.

The second error calculation part 613 calculates a second error signal which indicates an error between a second input signal and a first pseudo echo signal, and adds the first error signal and the second error signal to each other. The second error calculation part 613 outputs an addition signal obtained by adding a first error signal and a second error signal to each other to the averaging processing part 614.

The averaging processing part 614 averages the addition signal obtained by adding the first error signal and the second error signal to each other. The averaging processing part 614 outputs an average signal obtained by averaging an addition signal which is obtained by adding a first error signal and a second error signal to each other to the adaptive filter 611.

The adaptive filter 611 produces a first pseudo echo signal which indicates a component of a reproduced signal contained in an average signal using an average signal from the averaging processing part 614 and a reproduced signal. The adaptive filter 611 modifies a filter coefficient based on an inputted average signal, and produces a first pseudo echo signal by convoluting a modified filter coefficient and a reproduced signal. The adaptive filter 611 modifies a filter coefficient such that an average signal is minimized using an adaptive algorithm. As the adaptive algorithm, for example, an NLMS method, an AP method, or an RLS method can be used.

A first pseudo echo signal produced by the first echo canceller 61 is outputted to the third echo canceller 18 and the fourth echo canceller 19.

In the third embodiment, the conversation device includes two microphones. However, this disclosure is not particularly limited to such a case, and the conversation device may include three or more microphones. When the conversation device includes three or more microphones, the first echo canceller 61 performs adding and averaging of error signals between respective input signals from three or more microphones and a first pseudo echo signal, and outputs the first pseudo echo signal to echo cancellers which are provided to the respective three or more microphones.

In the third embodiment, the conversation device includes one speaker. However, this disclosure is not particularly limited to such a case, and the conversation device may include two or more speakers. In the case where the conversation device includes a plurality of speakers, it is necessary for the conversation device to include the same number of acoustic echo cancellation devices 1D as the plurality of speakers.

Next, an operation of the acoustic echo cancellation device 1D according to the third embodiment of this disclosure is described.

Figure 8:
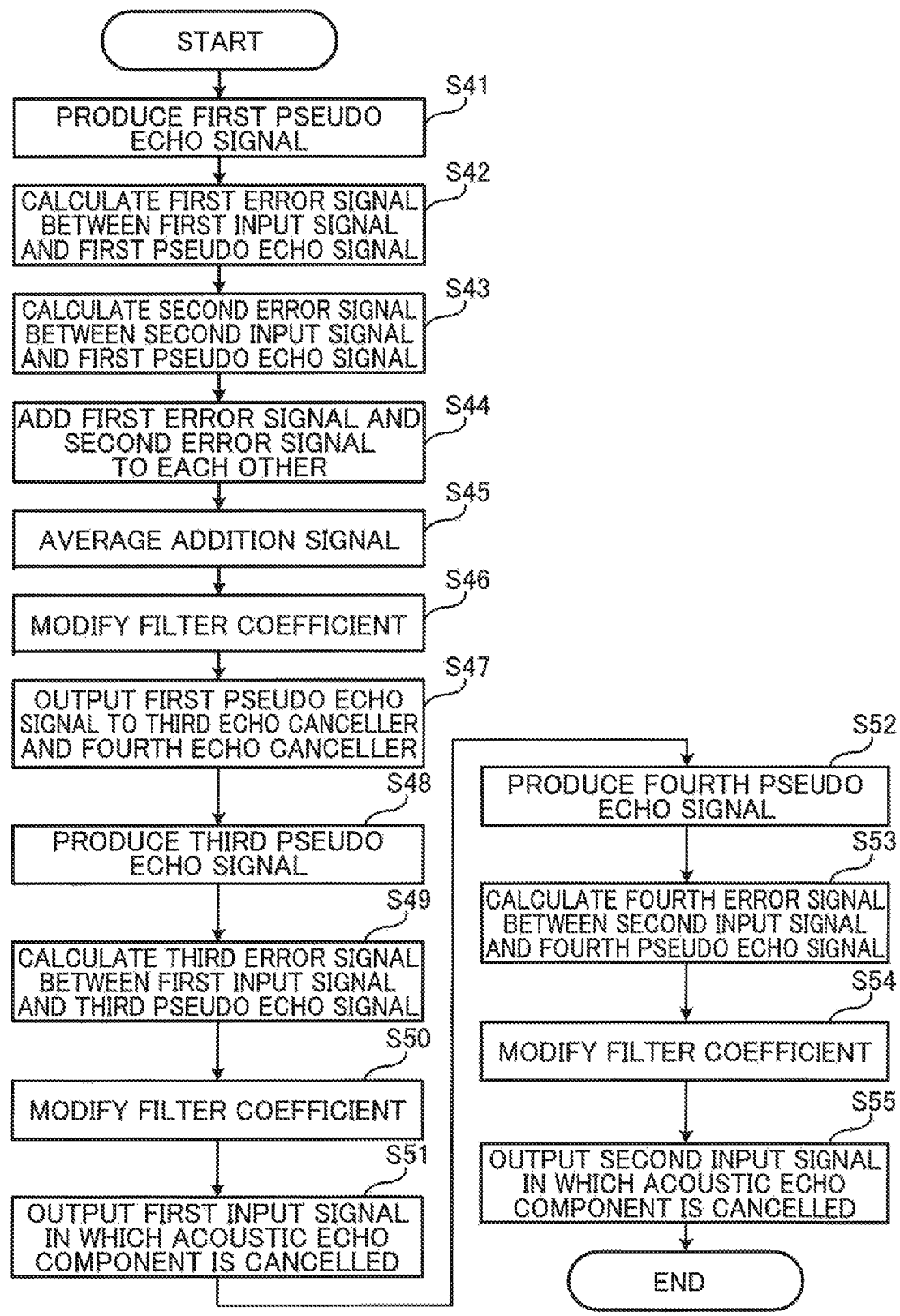
FIG. 8 is a flowchart for describing an operation of an acoustic echo cancellation device according to the third embodiment of this disclosure.

FIG. 8 is a flowchart for describing an operation of the acoustic echo cancellation device according to the third embodiment of this disclosure.

First, in step S41, the adaptive filter 611 of the first echo canceller 61 produces a first pseudo echo signal which indicates a component of a reproduced signal contained in an average signal by convoluting a filter coefficient and the reproduced signal.

Next, in step S42, the first error calculation part 612 calculates a first error signal which is a differential between the first input signal from the first microphone 11 and the first pseudo echo signal from the adaptive filter 611 by subtracting the first pseudo echo signal from the first input signal. The first error calculation part 612 outputs the calculated first error signal to the second error calculation part 613.

Next, in step S43, the second error calculation part 613 calculates a second error signal which is a differential between the second input signal from the second microphone 12 and the first pseudo echo signal from the adaptive filter 611 by subtracting the first pseudo echo signal from the second input signal.

Next, in step S44, the second error calculation part 613 adds the first error signal and the second error signal. The second error calculation part 613 outputs a calculated addition signal obtained by adding the first error signal and the second error signal to each other to the averaging processing part 614.

Next, in step S45, the averaging processing part 614 averages the addition signal obtained by adding the first error signal and the second error signal to each other. The averaging processing part 614 outputs an average signal obtained by averaging the addition signal to the adaptive filter 611.

Next, in step S46, the adaptive filter 611 modifies a filter coefficient based on the average signal inputted from the averaging processing part 614. The adaptive filter 611 produces the first pseudo echo signal by convoluting the modified filter coefficient and the reproduced signal.

Next, in step S47, the adaptive filter 611 outputs the produced first pseudo echo signal to the third echo canceller 18 and the fourth echo canceller 19.

Next, in step S48, the adaptive filter 181 of the third echo canceller 18 produces a third pseudo echo signal which indicates a component of the first pseudo echo signal contained in the first input signal by convoluting the filter coefficient and the first pseudo echo signal.

Next, in step S49, the error calculation part 182 calculates a third error signal between the first input signal from the first microphone 11 and the third pseudo echo signal from the adaptive filter 181 by subtracting the third pseudo echo signal from the first input signal. The error calculation part 182 outputs the calculated third error signal to the adaptive filter 181.

Next, in step S50, the adaptive filter 181 modifies a filter coefficient based on the third error signal inputted from the error calculation part 182. The adaptive filter 181 produces the third pseudo echo signal by convoluting the modified filter coefficient and the first pseudo echo signal.

Next, in step S51, the error calculation part 182 outputs the first input signal in which the acoustic echo component is cancelled to the first output terminal 20. That is, the error calculation part 182 cancels an acoustic echo component from the first input signal by subtracting the third pseudo echo signal from the adaptive filter 181 from the first input signal from the first microphone 11.

Next, in step S52, the adaptive filter 191 of the fourth echo canceller 19 produces a fourth pseudo echo signal which indicates a component of the first pseudo echo signal contained in the second input signal by convoluting the filter coefficient and the first pseudo echo signal.

Next, in step S53, the error calculation part 192 calculates a fourth error signal between the second input signal from the second microphone 12 and the fourth pseudo echo signal from the adaptive filter 191 by subtracting the fourth pseudo echo signal from the second input signal. The error calculation part 192 outputs the calculated fourth error signal to the adaptive filter 191.

Next, in step S54, the adaptive filter 191 modifies a filter coefficient based on the fourth error signal inputted from the error calculation part 192. The adaptive filter 191 produces the fourth pseudo echo signal by convoluting the modified filter coefficient and the first pseudo echo signal.

Next, in step S55, the error calculation part 192 outputs the second input signal in which the acoustic echo component is cancelled to the second output terminal 21. That is, the error calculation part 192 cancels an acoustic echo component from the second input signal by subtracting the fourth pseudo echo signal from the adaptive filter 191 from the second input signal from the second microphone 12.

In an initial stage where the acoustic echo cancellation device 1D starts its operation, the filter coefficient is not sufficiently modified. Accordingly, an acoustic echo component cannot be sufficiently cancelled from the first input signal and the second input signal. However, by repeatedly performing processing in step S41 to step S55, the filter coefficient is sufficiently modified and hence, the acoustic echo component can be sufficiently cancelled from the first input signal and the second input signal.

In this manner, the first echo canceller 61 produces the first pseudo echo signal which indicates a component of the reproduced signal contained in the input signals obtained from at least two microphones, and the second echo canceller 17 produces a second pseudo echo signal which indicates a component of the first pseudo echo signal contained in at least one input signal, and cancels an acoustic echo component of at least one input signal using the produced second pseudo echo signal.

Accordingly, the second pseudo echo signal is produced using the already produced first pseudo echo signal. Accordingly, a filter length (tap length) of the adaptive filter used in producing the second pseudo echo signal can be shortened and hence, a conversation performance can be maintained and, at the same time, an arithmetic amount for removing an acoustic echo can be reduced.

Particularly, echo cancelling processing by the echo canceller on a first stage (first echo canceller 61) has substantially the same filter length (arithmetic amount) compared to the prior art. However, echo cancelling processing by the echo cancellers on the second stage and succeeding stages (the third echo canceller 18 and the fourth echo canceller 19) uses the already produced first pseudo echo signal and hence, can have a short filter length compared to the prior art. As a result, an arithmetic amount can be reduced compared to the prior art. Accordingly, the larger the number of microphone becomes, the smaller an arithmetic amount becomes compared to the prior art.

Further, the arrangement positions of the plurality of microphones differ from each other. Accordingly, a waveform of a reflected wave (echo signal) inputted as an acoustic echo differs between the plurality of microphones. In the case where a phase of an echo signal is opposite to a phase of an input signal which is a voice of a talker, when the echo signal is added to the input signal, the input signal is eliminated. Accordingly, it is difficult to cancel an acoustic echo of the input signal. However, in the third embodiment, the respective error signals of the first input signal and the second input signal from at least two microphones are added to each other and are averaged and hence, an effect of loss of a signal caused by interference of acoustic echoes can be reduced.

In the third embodiment, the acoustic echo cancellation device 1D may include a first delay part 81 between the first microphone 11 and the third echo canceller 18, or may include a second delay part 82 between the second microphone 12 and the fourth echo canceller 19.

In the third embodiment, a reproduced signal in a time domain, a first input signal in the time domain, and a second input signal in the time domain are inputted to the first echo canceller 61, and a first input signal in a time domain, a second input signal in the time domain, and a first pseudo echo signal in the time domain are inputted to the second echo canceller 17. However, this disclosure is not particularly limited to such a case. A reproduced signal in a frequency domain, a first input signal in the frequency domain, and a second input signal in the frequency domain may be inputted to the first echo canceller 61, and a first input signal in a frequency domain, a second input signal in the frequency domain, and a first pseudo echo signal in the frequency domain may be inputted to the second echo canceller 17. Hereinafter, a modification of the third embodiment is described.

Figure 9:
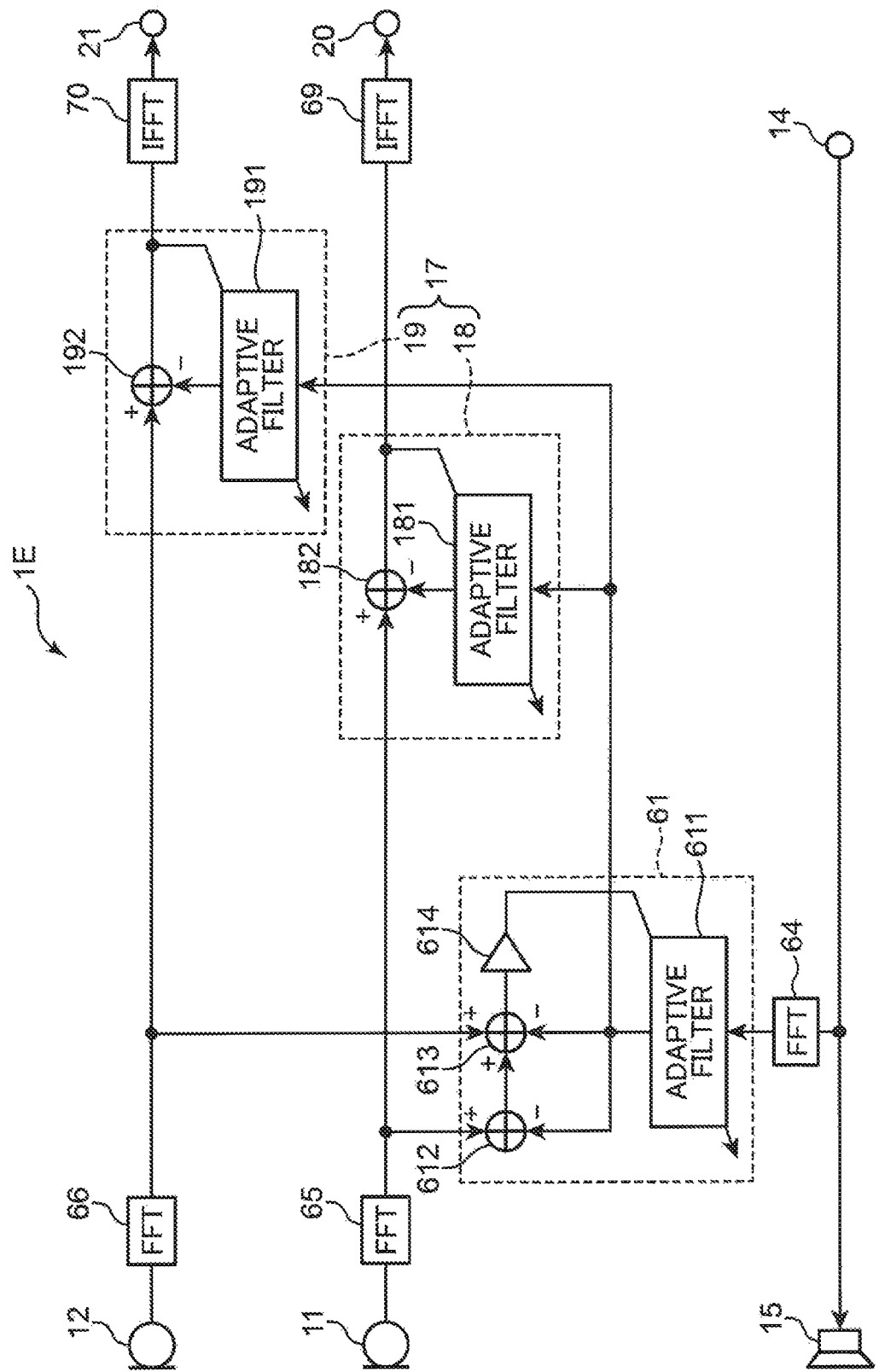
FIG. 9 is a view showing a configuration of a conversation device according to a modification of the third embodiment of this disclosure.

FIG. 9 is a view showing the configuration of a conversation device according to a modification of the third embodiment of this disclosure.

The conversation device shown in FIG. 9 includes an acoustic echo cancellation device 1E, a first microphone 11, a second microphone 12, an input terminal 14, a speaker 15, a first output terminal 20, and a second output terminal 21. In the modification of the third embodiment, constitutional elements equal to the corresponding constitutional elements of the third embodiment are given the same symbols, and the description of these constitutional elements is omitted.

The acoustic echo cancellation device 1E includes a first echo canceller 61, a second echo canceller 17, fast Fourier transform parts 64, 65, 66, and inverse fast Fourier transform parts 69, 70.

The fast Fourier transform parts 64, 65, 66 perform a discrete Fourier transform at a high speed. The fast Fourier transform part 64 transforms a reproduced signal in a time domain inputted to the first echo canceller 61 into a reproduced signal in a frequency domain. The fast Fourier transform part 65 transforms a first input signal in a time domain outputted from the first microphone 11 into a first input signal in a frequency domain. The fast Fourier transform part 66 transforms a second input signal in a time domain outputted from the second microphone 12 into a second input signal in a frequency domain.

The inverse fast Fourier transform parts 69, 70 perform an inverse discrete Fourier transform at a high speed. The inverse fast Fourier transform part 69 transforms a first input signal in a frequency domain inputted from the third echo canceller 18 to the first output terminal 20 into a first input signal in a time domain. The inverse fast Fourier transform part 70 transforms a second input signal in a frequency domain inputted from the fourth echo canceller 19 to the second output terminal 21 into a second input signal in a time domain.

The first echo canceller 61 produces a first pseudo echo signal in a frequency domain using a first input signal in a frequency domain, and a second input signal in a frequency domain, and a reproduced signal in a frequency domain.

The third echo canceller 18 produces a third pseudo echo signal in a frequency domain using a first input signal in a frequency domain and a first pseudo echo signal in a frequency domain, and cancels an acoustic echo component of the first input signal in a frequency domain using the produced third pseudo echo signal in the frequency domain.

The fourth echo canceller 19 produces a fourth pseudo echo signal in a frequency domain using a second input signal in a frequency domain and a first pseudo echo signal in a frequency domain, and cancels an acoustic echo component of the second input signal in the frequency domain using the produced fourth pseudo echo signal in the frequency domain.

In the modification of the third embodiment, adaptive filters 611, 181, 191 can use an adaptive algorithm in a frequency domain, and a convolution operation can be performed by multiplication and hence, an arithmetic amount can be further reduced.

In the modification of the third embodiment, the acoustic echo cancellation device 1E may include the first delay part 81 between the first microphone 11 and the third echo canceller 18, and may include the second delay part 82 between the second microphone 12 and the fourth echo canceller 19. In this case, the fast Fourier transform part 65 is disposed between a branch point between the first microphone 11 and the error calculation part 182 and the first error calculation part 612, and the first delay part 81 and the fast Fourier transform part are disposed between the branch point and the error calculation part 182. The fast Fourier transform part 66 is disposed between a branch point between the second microphone 12 and the error calculation part 192 and the second error calculation part 613, and the second delay part 82 and the fast Fourier transform part are disposed between the branch point and the error calculation part 192.

In the above-mentioned respective embodiments, each constitutional element may be formed of a dedicated hardware, or may be realized by executing a software program suitable for each constitutional element. Each constitutional element may be realized by allowing a program executing part such as a CPU or a processor to read a software program recorded in a recording medium such as a hard disc or a semiconductor memory and to execute the software program.

A part or the entirety of functions of the device according to the embodiment of this disclosure is typically realized in the form of large scale integration (LSI) which is an integrated circuit. These constitutional parts may be individually formed as one chip or may be formed as one chip such that one chip includes some of or all constitutional elements. The integrated circuit is not limited to LSI, and may be realized in the form of a dedicated circuit or a general-purpose processor. It is also possible to use a Field Programmable Gate Array (FPGA) which is programmable after manufacturing an LSI or a reconfigurable processor capable of reconstructing the connection and the setting of circuit cells in an LSI.

A part of or the entirety of functions of the device according to the embodiment of this disclosure may be realized by allowing a processor such as a CPU to execute a program.

Numerals used in the description made heretofore are exemplified for specifically describing this disclosure, and this disclosure is not limited to the exemplified numerals.

The order that the respective steps indicated in the previously described flowchart are exemplified for specifically describing this disclosure, and the steps may be performed in the orders other than the above-mentioned order within the scope that substantially the same advantageous effects of the present invention can be acquired. A part of the above-mentioned step may be performed simultaneously with (parallel with) other steps.

The acoustic echo cancellation device, the acoustic echo cancellation method and the non-transitory computer readable recording medium recording an acoustic echo cancellation program according to this disclosure can maintain a conversation performance and can reduce an arithmetic amount for removing an acoustic echo. Accordingly, the acoustic echo cancellation device, the acoustic echo cancellation method and the non-transitory computer readable recording medium recording an acoustic echo cancellation program are useful as an acoustic echo cancellation device, an acoustic echo cancellation method, and a non-transitory computer readable recording medium recording an acoustic echo cancellation program which cancel an acoustic echo component of an input signal outputted from a microphone.

This application is based on U.S. Provisional Application No. 62/778,684 filed in the United States Patent and Trademark Office on Dec. 12, 2018, Japanese Patent application No. 2019-073738 filed in Japan Patent Office on Apr. 8, 2019, and Japanese Patent application No. 2019-163681 filed in Japan Patent Office on Sep. 9, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An acoustic echo cancellation device, comprising:
   an adder configured to generate an addition signal by adding a first input signal outputted from a first microphone and a second input signal outputted from a second microphone to each other;
   a first echo canceller configured to produce, using the addition signal and a reproduced signal outputted to a speaker, a first pseudo echo signal that indicates a component of the reproduced signal contained in the addition signal;
   a second echo canceller configured to produce, using first input signal and the first pseudo echo signal, a second pseudo echo signal that indicates a component of the first pseudo echo signal contained in the first input signal, and to cancel an acoustic echo component of the first input signal using the produced second pseudo echo signal; and
   a third echo canceller configured to produce, using the second input signal and the first pseudo echo signal, a third pseudo echo signal that indicates a component of the first pseudo echo signal contained in the second input signal, and to cancel an acoustic echo component of the second input signal using the produced third pseudo echo signal.

2. The acoustic echo cancellation device according to claim 1, further comprising:
   a first delay part configured to delay the first input signal and a second delay part configured to delay the second input signal,
   wherein the second echo canceller is further configured to produce the second pseudo echo signal using the delayed first input signal and the first pseudo echo signal, and to cancel the acoustic echo component in the delayed first input signal: and
   wherein the third echo canceller is further configured to produce the third pseudo echo signal using the delayed second input signal and the first pseudo echo signal, and to cancel the acoustic echo component in the delayed second input signal.

3. The acoustic echo cancellation device according to claim 1, further comprising:
   a first converting part configured to convert the addition signal in a time domain into an addition signal in a frequency domain;
   a second converting part configured to convert the reproduced signal in a time domain into a reproduced signal in a frequency domain;
   a third converting part configured to convert the first input signal in a time domain into a first input signal in a frequency domain; and
   a fourth converting part configured to convert the second input signal in a time domain into a second input signal in a frequency domain.

4. The acoustic echo cancellation device according to claim 1,
   wherein a filter length of the second echo canceller is shorter than a filter length of the first echo canceller.

5. An acoustic echo cancellation method in an acoustic echo cancellation device that cancels an acoustic echo component of a first input signal outputted from a first microphone and a second input signal outputted from a second microphone, the method comprising:
   generating an addition signal by adding the first input signal and the second input signal to each other;
   producing a first pseudo echo signal that indicates a component of a reproduced signal contained in the addition signal using the addition signal and the reproduced signal outputted to a speaker;

producing a second pseudo echo signal that indicates a component of the first pseudo echo signal contained in the first input signal using the first input signal and the first pseudo echo signal;

cancelling an acoustic echo component of the first input signal using the produced second pseudo echo signal;

producing a third pseudo echo signal that indicates a component of the first pseudo echo signal contained in the second input signal using the second input signal and the first pseudo echo signal; and cancelling an acoustic echo component of the second input signal using the produced third pseudo echo signal.

6. A non-transitory computer readable recording medium recording an acoustic echo cancellation program for causing a computer to function as:

an adder configured to generate an addition signal by adding a first input signal outputted from a first microphone and a second input signal outputted from a second microphone to each other;

a first echo canceller configured to produce, using the addition signal and a reproduced signal outputted to a speaker, a first pseudo echo signal that indicates a component of the reproduced signal contained in the addition signal;

a second echo canceller configured to produce, using the first input signal and the first pseudo echo signal, a second pseudo echo signal that indicates a component of the first pseudo echo signal contained in the first input signal, and to cancel an acoustic echo component of the first input signal using the produced second pseudo echo signal; and a third echo canceller configured to produce, using the second input signal and the first pseudo echo signal, a third pseudo echo signal that indicates a component of the first pseudo echo signal contained in the second input signal, and to cancel an acoustic echo component of the second input signal using the produced third pseudo echo signal.

\* \* \* \* \*